United States Patent
Rapp

(10) Patent No.: US 10,753,824 B2
(45) Date of Patent: Aug. 25, 2020

(54) DETECTION OF GAINERS AND EXAGGERATED LOSSES IN UNIDIRECTIONAL OTDR TRACES

(71) Applicant: Xieon Networks S.à.r.l., Luxembourg (LU)

(72) Inventor: Lutz Rapp, Deisenhofen (DE)

(73) Assignee: Xieon Networks S.à.r.l., Luxembourg (LU)

( * ) Notice: Subject to any disclaimer, the term of this patent is extended or adjusted under 35 U.S.C. 154(b) by 0 days.

(21) Appl. No.: 16/341,731

(22) PCT Filed: Nov. 21, 2017

(86) PCT No.: PCT/EP2017/079852
§ 371 (c)(1),
(2) Date: Apr. 12, 2019

(87) PCT Pub. No.: WO2018/095883
PCT Pub. Date: May 31, 2018

(65) Prior Publication Data
US 2020/0049587 A1   Feb. 13, 2020

(30) Foreign Application Priority Data

Nov. 22, 2016   (EP) ..................................... 16199959

(51) Int. Cl.
G01M 11/00 (2006.01)
(52) U.S. Cl.
CPC ...... G01M 11/319 (2013.01); G01M 11/3109 (2013.01); G01M 11/3145 (2013.01)
(58) Field of Classification Search
CPC ............. G01M 11/31; G01M 11/3109; G01M 11/3127; G01M 11/3136; G01M 11/3145; G01M 11/319

(Continued)

(56) References Cited

U.S. PATENT DOCUMENTS

| 5,298,965 A | * | 3/1994 | Spirit | ................... G01M 11/319 356/73.1 |
| 5,592,282 A | * | 1/1997 | Hartog | ................... G01K 11/32 250/227.18 |

(Continued)

OTHER PUBLICATIONS

International Search Report and Written Opinion, PCT/EP2017/079852, dated Feb. 9, 2018, 14 pages.

(Continued)

*Primary Examiner* — Gordon J Stock, Jr.
(74) *Attorney, Agent, or Firm* — Nelson Mullins Riley & Scarborough LLP; Anthony A. Laurentano

(57) ABSTRACT

A method of distinguishing whether a detected change in reflected power in an optical time domain reflectometer (OTDR) measurement carried out in a fiber optic transmission system (16) using an OTDR is caused by a an event causing actual attenuation or a change in a mode field diameter, comprising the steps of emitting a succession of first sampling light pulses of a first wavelength into the fiber optic transmission system (16) while a pumping signal with a second wavelength is emitted into the fiber optic transmission system (16), and measuring a first OTDR trace (34') resulting from the reflection of the first sampling light pulses in the fiber optic transmission system (16), such that the first sampling light pulses and their reflections interact with the pumping signal via stimulated Raman scattering. The method further comprises a step (36) of determining, based at least on information extracted from the first OTDR trace (34'), whether the detected change is mainly due to an event causing actual attenuation or to a change in the mode field diameter in the fiber optic transmission system (16).

24 Claims, 12 Drawing Sheets

(58) Field of Classification Search
USPC .......................................................... 356/73.1
See application file for complete search history.

(56) References Cited

U.S. PATENT DOCUMENTS

| | | | | |
|---|---|---|---|---|
| 5,724,126 | A * | 3/1998 | Nishi | G01M 11/3181 |
| | | | | 356/73.1 |
| 6,081,323 | A * | 6/2000 | Mahgerefteh | H04B 10/0731 |
| | | | | 356/73.1 |
| 7,061,665 | B2 * | 6/2006 | Sobe | G01M 11/319 |
| | | | | 359/334 |
| 8,068,275 | B2 * | 11/2011 | Shukunami | G01M 11/319 |
| | | | | 359/334 |
| 9,134,197 | B2 * | 9/2015 | L'Heureux | G01M 11/3109 |
| 9,360,392 | B2 * | 6/2016 | Benjamin | G01M 11/3109 |
| 9,423,316 | B2 * | 8/2016 | Perron | G01M 11/3118 |
| 9,841,348 | B2 * | 12/2017 | Rapp | G02B 6/4446 |
| 10,193,620 | B2 * | 1/2019 | Shiner | H04B 10/0775 |
| 10,411,796 | B1 * | 9/2019 | Archambault | H04B 10/077 |
| 10,547,404 | B1 * | 1/2020 | Al Sayeed | H04B 10/0777 |
| 2008/0013162 | A1 | 1/2008 | Shukunami et al. | |
| 2011/0149270 | A1 * | 6/2011 | Nagel | G01M 11/3145 |
| | | | | 356/73.1 |
| 2012/0176607 | A1 * | 7/2012 | Ott | G01M 11/3109 |
| | | | | 356/73.1 |
| 2015/0198503 | A1 | 7/2015 | Leblanc et al. | |

OTHER PUBLICATIONS

Kiss, G. et al., "Impact of MFD mismatch on OTDR splice loss measurements," Lightwave, Sep. 1, 2002, 6 pages.

* cited by examiner

11a

11b

12a

12b

DETECTION OF GAINERS AND EXAGGERATED LOSSES IN UNIDIRECTIONAL OTDR TRACES

RELATED APPLICATIONS

This application is a 35 U.S.C. 371 national stage filing of International Application No. PCT/EP2017/079852, filed on Nov. 21, 2017, which claims priority to European Patent Application No. 16199959.4, filed on Nov. 22, 2016. The entire contents of these applications are incorporated herein by reference in their entirety.

FIELD OF THE INVENTION

The present invention is in the field of fiber-optic communication. In particular, the present invention relates to a method of distinguishing whether a detected change in reflected power in an optical time domain reflectometer (OTDR) measurement is caused by actual localized attenuation of a propagating lightwave or by a change in a mode field diameter in a fiber optic transmission system, a method of determining a change in absorption based thereon, and a correspondingly configured OTDR for determining a change in absorption.

BACKGROUND OF THE INVENTION

OTDRs are used in the field of fiber optic communication to gain insight into the main optical parameters of a fiber optic transmission system, like information regarding fiber attenuation, and to detect impairments or irregularities, like deteriorated connectors or fiber breakages.

In fiber optic communications, an electromagnetic wave—also called lightwave—propagates through an optical fiber and thus transmits information. For this purpose, the lightwave is modulated, which means that a physical parameter of the lightwave is varied depending on an information carrying signal. In a stricter sense, the term "light" denotes electromagnetic radiation within a wavelength range with high sensitivity of the human eye. Typically, the human eye is sensitive to radiation from 400 nm to 780 nm. In physics, the term "light" is sometimes used in a broader sense and might refer to any kind of electromagnetic radiation, whether visible or not. Fiber optic communication usually makes use of electromagnetic radiation in the infrared range that is not visible to the human eye. Commonly, electromagnetic waves propagating along the fiber axis are denoted as lightwaves. In the following, the terms "light" and "lightwave" will refer to any kind of electromagnetic wave that can be guided within an optical fiber irrespective of its wavelength.

An OTDR typically comprises a light source and a detector. The light source sends optical pulses into the fiber optic transmission system, which in the course of propagation in the fiber experience attenuation and are continuously reflected back towards the light source. This is due to irregularities and impurities inside the fiber that cause the light to be redirected in different directions creating both signal attenuation and backscattering, known as Rayleigh backscattering. Rayleigh backscattering can be used to calculate the level of attenuation in the fiber as a function of fiber distance.

Reflected optical pulses are received by the detector, which records the part of the optical power reflected back together with the corresponding delay in the form of a so-called OTDR trace. An OTDR trace typically characterizes the absorption properties of a fiber optic transmission system by registering the power of the reflected light as a function of distance along the fiber optic transmission system upon assuming constant propagation velocity of the optical signals. Whenever the amount of back reflected light changes abruptly at a given location of a fiber optic transmission system, this change can be noticed in the corresponding OTDR trace, generally in the form of a sudden increase or a sudden drop of back reflected power.

The analysis of OTDR traces may hence help to detect deficiencies in a fiber optic transmission system such as splices or connectors providing increased loss, reflection points, or other kind of irregularity. While OTDRs work acceptably well in fiber optic transmission systems with uniform fiber characteristics, a non-negligible risk of wrong results exists in the case of fiber optic transmission systems composed of different fiber types. A change in fiber type is typically associated with a change in the so-called mode field diameter of the fiber.

The mode field diameter or mode field area is a measure of the radial extent of the optical intensity (i.e. the optical power per unit area) distribution of a mode across a single-mode fiber. For example in the case of a Gaussian intensity distribution, the electric and magnetic field strengths are reduced to 1/e of the maximum values at locations in a plane perpendicular to the fiber axes for which the distance to the intersection of the center of the fiber core with this plane corresponds to half of the mode field diameter, i.e. to the mode field radius. In other words, the power density at the mode field diameter is reduced to $1/e^2$ of the maximum power density.

The amount of power continuously reflected back in a fiber optic transmission system due to Rayleigh backscattering depends on several physical parameters such as the effective refractive index and the scattering coefficient, but also shows a strong dependence on the mode field diameter. In particular, the backscattering factor scales inversely with the square of the mode field diameter, i.e. inversely with the mode field area. In practical OTDR measurement terms, backscattering characteristics are mostly influenced by the refractive index profile and geometrical properties of the fiber. Since different fiber types usually have different mode field diameters, a change in fiber type along the optical path of an optical signal being transmitted in a fiber optic transmission system results in a change in the amount of backscattered light that is primarily due to the corresponding change in mode field diameter. In particular, a connection between different fiber types may result in a decrease in the mode field diameter, and hence in an increase of the amount of light backscattered. This situation is often referred to as a "gainer" in the art and is a clear indication of such a connection between different fiber types, for a splice between identical fibers never results in such an increase.

However, depending on the concrete change in a mode field diameter, a connection between different fiber types may also result in an increase in the mode field diameter, and hence in a decrease in the amount of light backscattered, and in particular in a decrease which is bigger than the decrease that would normally be caused by actual attenuation at that connection or splice. Such cases are commonly referred to as "exaggerated loss" and make a correct determination of the fiber attenuation difficult. This is due to the fact that in many cases a significant if not predominant part of detected change in the amount of backscattered light is actually due to the change in the mode field diameter and not to events causing actual attenuation, which may play a minor role. Therefore, the analysis of the corresponding OTDR trace may lead to inaccurate results and/or to a wrong interpretation, such as an over-estimation of the true increase in absorption losses. Consequently, a connection between different fiber types may erroneously be reported as a bad quality connection or even as an irregularity in the fiber optic transmission system, while the true cause of the apparent increase of loss is actually an increase of mode field diameter of the fibers involved.

In order to avoid such wrong diagnostics in the analysis of OTDR traces, averaging based on bidirectional OTDR traces taken from the two end points of a fiber optic transmission system is recommended. However, such solutions are only applicable to short optical links as long as access to both ends of the link is possible and there is a sufficient overlap of the respective measurement ranges. However, a typical single-span submarine fiber optic transmission system comprises submarine cables carrying several optical fibers and extends over e.g. 300 km or more. This makes measuring the same part of a fiber optic transmission system from both sides impossible. Further, many such systems comprise remote optical pumped amplifiers (ROPAs), and parts of the system may be difficult to access. Bidirectional OTDR measurements are not possible in fiber optic transmission systems comprising ROPAs even if the ROPAs do not include an isolator. This is due to the fact that unpumped erbium-doped fiber (EDF) coils introduce significant losses in the wavelength range of the transmitted signals.

In addition, terrestrial fibers are typically connected to submarine fibers at landing stations so that direct access to the submarine fibers is very often not possible. For example, in regions close to landing stations, an optical cable is typically buried in the ground in order to avoid the high risk of fiber breakage to occur in shallow water. In addition, the type of fiber used for terrestrial connections is quite often different from that of fibers used for submarine connections. However, characterizing those parts of a fiber optic transmission system close to the landing stations is of major importance. This increases the need of accurate and reliable interpretation of unidirectional OTDR measurements, which is currently not possible in most long-haul fiber optic transmission systems.

Live video analysis of fiber alignment during splicing has been suggested as a possible alternative solution. However, this procedure is not only costly and technically involved but also not applicable to already installed fiber optic transmission systems.

In view of the above, there is room for technical improvements in the determination and analysis of events causing actual attenuation like splice losses and changes in absorption in unidirectional OTDR measurements.

SUMMARY OF THE INVENTION

The problem underlying the invention is to provide means and methods for identifying situations in which a sudden increase or a sudden drop in reflected power detected in an optical time domain reflectometer (OTDR) measurement is due to events causing actual attenuation, and situations in which this is due to a change in the mode field diameter, which is typically associated with a transition from one fiber type to another, and for correctly determining a change in the absorption in the fiber optic transmission system taking this into account. This problem is solved by a method of distinguishing whether a detected change in reflected power in an OTDR measurement carried out in a fiber optic transmission system using an OTDR is caused by an event causing actual attenuation or by a change in the main field diameter in the fiber optic transmission system according to claim 1, by a method of determining a change in absorption in a fiber optic transmission system using an OTDR according to claim 17, and by an optical time domain reflectometer according to claim 18. Preferable embodiments of the invention are described in the dependent claims.

Herein, "reflected power" is understood to refer to the power of the reflection of sampling light pulses sent into the fiber optic transmission system in the course of an OTDR measurement, which are reflected in said system and detected by the detector to generate a corresponding OTDR trace. An "event causing actual attenuation", in the following "attenuation event", refers herein to any kind of irregularity in a fiber optic transmission system, such as splices and connectors causing losses in the power and/or quality of an optical signal being transmitted through the fiber optic transmission system, like for example due to fiber connections, uncontrolled circumstances or deteriorated properties of the fiber optic transmission system, for instance owing to intact or tainted splice connections between connected fibers, irregularities, breakages, defects or any kind of partial interruption in the optical path of said optical signals.

The method of the invention comprises a first step of emitting a succession of first sampling light pulses of a first wavelength into the fiber optic transmission system while a pumping signal with a second wavelength is emitted into the fiber optic transmission system, and measuring a first OTDR trace resulting from the reflection of the first sampling light pulses in the fiber optic transmission system, such that the first sampling light pulses and their reflections interact with the pumping signal via stimulated Raman scattering (SRS.

In this configuration, the first wavelength serves as a probe experiencing stimulated Raman scattering, while the second wavelength serves as a pump for inducing said stimulated Raman scattering. The term "probe signal" is hence used herein to refer to the first sampling light pulses. The term "pumping signal" is used herein in a broad sense and covers any kind of optical signal causing amplification or excess attenuation to the probe signal by means of stimulated Raman scattering. Preferably, it is an optical signal having constant power during the measurement of the reflected part of the pulse launched into the optical fiber transmission system. Such signals are typically called continuous-wave (cw) signal. However, an optical signal with varying power might also be used.

Preferably, the pumping signal is emitted as a continuous wave at a constant power higher than the power of the first sampling light pulses. Herein, a "light pulse" is understood to have a broad meaning and covers any kind of optical signal displaying an amplitude variation with respect to a zero value for a finite period of time. An OTDR trace is understood herein as any kind of optical or digital signal, typically of time-dependent nature, generated in response to the detection of the reflection of the sampling light pulses, which allows extracting information about the fiber optic transmission system. Preferably, an OTDR trace comprises a time-dependent electrical signal, which typically has an amplitude proportional to the power of the corresponding reflected light pulses received by the OTDR.

The method further comprises a step of determining, based at least on information extracted from the first OTDR trace, whether the detected change is mainly due to an attenuation event or to a change in the mode field diameter in the fiber optic transmission system. The inventor has observed that it is possible to determine from a single OTDR trace obtained in the described way whether a detected change in reflected power is due to an attenuation event, to a change in mode field diameter or to a combination of both. Details of the involved calculations will be shown below. The underlying physical reason for this is that attenuation events and changes in the mode field diameter affect the interaction of optical signals being transmitted in the fiber optic transmission system via stimulated Raman scattering differently.

Advantageously, the method of the invention may be implemented for use in OTDR equipment installed in existing fiber optic transmission systems, thereby providing an easy and cost-effective way of improving the detection and analysis capabilities of said OTDR.

According to a preferred embodiment of the invention, the first wavelength is larger than the second wavelength, such that the first sampling light pulses and their reflections are Raman amplified by the pumping signal. In this configuration, the longer first wavelength serves as a probe experiencing Raman amplification, while the smaller second wavelength serves as a pump for inducing Raman amplification of the first wavelength. The sensitivity of an OTDR can be thereby improved.

Alternatively, the first wavelength may be smaller than the second wavelength such that the sampling light pulses experience depletion by the pumping signal. In other words, the sampling light pulses may experience excess loss that can be described as a negative Raman gain. The magnitude of this negative Raman gain depends on the type of the event (actual attenuation or change of mode field diameter) in the same way as the positive Raman gain does. Thus, the same methods can be applied for analysis. However, sensitivity is smaller as compared with the configuration wherein the first wavelength is larger than the second wavelength.

In a preferred embodiment of the invention, the method further comprises a step of emitting a succession of second sampling light pulses of the second wavelength into the fiber optic transmission system and measuring a second OTDR trace resulting from the reflection of the second sampling light pulses in the fiber optic transmission system. Then the step of determining whether the detected change is mainly due to an attenuation event or to a change in the mode field diameter in the fiber optic transmission system comprises determining, based on information extracted from both the first and second OTDR traces, whether the detected change is mainly due to an attenuation event or to a change in the mode field diameter in the fiber optic transmission system. In other words, stating that distinguishing between attenuation events and changes in mode field diameter it based "at least" on information extracted from said first OTDR trace shall indicate that it could be based on information solely extracted from the first OTDR trace or from the first OTDR trace in combination with further OTDR traces, such as the second OTDR trace referred to above.

Accordingly, from an OTDR trace obtained from Raman amplified signals, optionally combined with an "ordinary OTDR trace", it is generally possible to distinguish the effect of attenuation events from the effect of mode field diameter changes. While the desired information is "contained in" the first OTDR trace, and particularly in the combination of the first and second OTDR traces, there are of course many possible ways of extracting it by appropriate processing or analysis of the first and (possibly) second OTDR trace(s), and the invention is not limited to any single one of them. Instead, the specific way of extracting information can be chosen according to circumstance or convenience, some specific examples being shown below. However, all embodiments of the present invention have in common that at least the aforementioned first OTDR trace obtained from Raman amplified signals is measured, and that the determination regarding the cause of the detected change in reflected power (i.e. an attenuation event or a change in mode field diameter) can be advantageously based on information extracted at least from the first OTDR trace. However, additional information allowing for a more precise distinguishing and determining can be obtained from further OTDR traces, such as the second OTDR trace referred to above.

For example, from the second OTDR trace, information about the fiber optic transmission system itself may be obtained, which preferably comprises information about the absorption properties of the fiber optic transmission system. The first OTDR trace may then be used to deduce from the effects of the detected change in reflected power upon Raman amplification whether said detected change is mainly caused by a an attenuation event or by a change in the mode field diameter. This way, the actual root cause for the detected change in reflected power can be identified, and potential wrong reports of the nature of the detected change can be avoided.

In a preferred embodiment of the invention, the method further comprises a step of emitting a succession of third sampling light pulses of the first wavelength into the optical transmission fiber and detecting a third OTDR trace resulting from the reflection of the third sampling light pulses in the optical transmission fiber, wherein the step of determining whether the detected change is mainly due to an attenuation event or to a change in the mode field diameter in the fiber optic transmission system is further based on information extracted from said third OTDR trace. In such case, the information extracted from the third OTDR trace preferably comprises information about the change in reflected power for the first wavelength caused by the attenuation event or the change in the mode field diameter. The steps of emitting a succession of first, second, and third sampling light pulses may be carried out in any order. Further, the step of emitting a succession of second sampling light pulses and the step of emitting a succession of third sampling light pulses may be carried out simultaneously.

In a preferred embodiment of the invention, the step of determining whether the detected change is mainly due to an attenuation event or to a change in the mode field diameter of the fiber optic transmission system is carried out by machine learning. Machine learning is a technique in which a computer progressively develops and improves the ability to carry out a task by analysing a sufficient amount of learning input. Hence, a machine learning tool provided with proper training data can develop the ability of reliably determining, from said aforementioned first, and optionally, second, and/or third OTDR traces, whether a detected change in reflected power in an OTDR trace is mainly due to an attenuation event or to a change in the mean field diameter in the corresponding fiber optic transmission system. Accordingly, machine learning is one of the possible ways of extracting the information regarding the cause of reflected power changes contained in the first, and optionally, second and/or third OTDR traces. It is in the nature of machine learning that a detailed understanding or modeling of the processes taking place in the fiber is not necessary. As long as the desired information is somehow reflected in the first, and optionally, second, and/or third OTDR traces, it can be discerned by machine learning upon appropriate training. The use of a machine learning algorithm advantageously constitutes a software-based solution which allows adapting existing OTDR setups to implement the method of the invention. This way a cost-effective and simple way of upgrading available setups by adapting them to implement the method of the invention is provided.

According to alternative preferred embodiments of the invention, the step of determining whether the detected change is mainly due to an attenuation event or to a change in the mode field diameter is carried out by checking for consistency of information about the first, and optionally, second, and/or third OTDR traces with empirical or calculated model data, wherein said model data comprises first model data representing a first scenario in which the change in reflected power is due to an attenuation event only, and second model data representing a second scenario in which the change in reflected power is due to a change in the mode field diameter of the fiber optic transmission system only. Thereby, information derived from the first, and optionally, second, and/or third OTDR traces is compared with two scenarios representing extreme cases in which the detected change in reflected power is entirely due to one root cause, namely either purely due to an attenuation event or to a change in a mode field diameter in a fiber optic transmission system. Note that this is again an example of determining the cause of the change based on information extracted from both the first, and optionally, second, and/or third OTDR traces.

This provides an easy and efficient way of establishing what the main root cause of the detected change in reflected power is. In case the information extracted from the first, and optionally, second, and/or third OTDR traces is more consistent with said first model data, it is likely that the detected change in reflected power corresponds to actual attenuation due to an attenuation event or to a different type connection causing real attenuation to the propagating lightwave and hence that the value of absorption that can be derived from the first OTDR trace is reliable. Conversely, if the information extracted from the first, and optionally, second, and/or third OTDR traces is more consistent with said second model data, the value of absorption that can be derived from the first OTDR trace is probably not correct, for most of the detected change in reflected power is likely to be due to a change in the mode field diameter of the fiber optic transmission system, for example owing to a connection between different fiber types.

The first and second model data can be empirically obtained or calculated based on a physical model of the fiber optic transmission system in question. Further, the first and second model data may correspond in preferred embodiments of the invention to estimated or calculated predictions for the first OTDR trace under the corresponding scenario, and the step of checking for consistency may comprise comparing the measured first OTDR trace with said estimated or calculated prediction for the first OTDR trace. Thereby, predictions of the first OTDR trace based respectively on the first scenario and on the second scenario may be estimated or calculated such that the measured first OTDR trace can be compared thereto. While in this embodiment only the first OTDR trace is compared with model data, still information extracted from the second and/or third OTDR trace may be employed, such as information useful for calculating the model data based on the physical model of the fiber optic transmission system, as will become more apparent from specific examples discussed below. Accordingly, this embodiment may also be an example of determining the cause of the detected change in reflected power based on information extracted from the first, and optionally, second, and/or third OTDR traces.

In a preferred embodiment of the invention, the model data comprises or is calculated based on an estimate of the corresponding values of the Raman gain experienced by the first sampling light pulses under the first and second scenarios. Since Raman gain is affected differently by the two possible causes of the detected change in reflected power under consideration, basing the model data on corresponding values of the Raman gain provides an easy and efficient way of determining whether the detected change is mainly due to an attenuation event or to a change in the mode field diameter in the fiber optic transmission system.

According to a preferred embodiment of the invention, the estimate of the Raman gain is obtained from a mathematical expression based on the assumption that the pumping signal is not depleted by the first sampling light pulses and thus the power of the pumping signal decays exponentially along the fiber optic transmission system. The expression may comprise a factor with an exponential function wherein the magnitude of the argument of this exponential function for the scenario with a change in the mode field diameter is twice as large as that for the scenario for an actual localized attenuation.

The estimate of the Raman gain $G(z)$ experienced by the first sampling light pulses under the first and second scenarios is preferably obtained from the expression $$G(z) = \frac{P_{pump}^0 \cdot g_R^I}{A_{eff}^I} \cdot \frac{1}{\alpha_{pump}}[1 - \exp(-\alpha_{pump}z)] \cdot \gamma \cdot \exp(-\delta \cdot a_{pump})$$

where $p_{pump}^0$ denotes the pump power before an attenuation event or a change in the mode field diameter causing the change in attenuation, $g_R^I$ is the Raman coefficient of the fiber optic transmission system before said attenuation event or change in the mode field diameter, $A_{eff}^I$ stands for the effective mode field area of the fiber optic transmission system before said attenuation event or change in the mode field diameter, $a_{pump}$ is the change in absorption displayed for the OTDR trace for the pumping signal (which in the first scenario it is identical to the attenuation actually experienced by the pump signal) at said attenuation event or change in the mode field diameter by the pump signal, $\alpha_{pump}$ is the attenuation coefficient of the pumping signal in the fiber optic transmission system after said attenuation event or change in the mode field diameter, z is the position along the fiber optic transmission fiber after said attenuation event or change in the mode field diameter, and γ is the ratio of the Raman coefficients of the fiber optic transmission system before and after the attenuation event or change in the mode field diameter, $$\gamma = \frac{g_R^{II}}{g_R^I},$$

with $g_R^{II}$ being the Raman coefficient of the fiber optic transmission system after said attenuation event or change in the mode field diameter, wherein the first scenario is characterised by a value of δ=1, and wherein the second scenario is characterised by a value δ=2.

Advantageously, the above expression or model data calculated based thereon may be mathematically fitted to the first OTDR trace. Apart from γ and δ, all parameters may be derived from the first, second, and/or third OTDR traces obtained according to embodiments of the invention. Further, in case information of the involved fiber type is available, an estimate of the value of γ can be provided. The value of the parameter δ providing the best fit to the actually measured first OTDR trace then reveals, depending on whether it is closer to 1 or 2, whether the detected change in reflected power is mainly due to an attenuation event (δ=1) or to a change in the mode field diameter (δ=2).

In the case that the aforementioned attenuation event or change in the mode field diameter corresponds to a connection between different fiber types, $g_R^I$ and $g_R^{II}$ respectively correspond to the Raman coefficient of the fiber type before and after the connection, and $\alpha_{pump}$ corresponds to the attenuation coefficient of the fiber type after the connection. Preferably, the value of $\alpha_{pump}$ may be obtained during the step of emitting a succession of sampling light pulses. Note that this is an example of the aforementioned "extraction of information from the second OTDR trace" In case the method includes a step of emitting a succession of third sampling light pulses, the value of $a_{pump}$ may be obtained during said step.

In preferred embodiments of the invention, the wavelength difference between the first and the second wavelength is between 20 nm and no nm, preferably between 40 nm and 100 nm.

According to preferred embodiments of the invention, at least one of the first and second wavelengths has a value of between 1400 nm and 1510 nm, preferably between 1420 nm and 1450 nm.

According to preferred embodiments of the invention, at least one of the first, second, and third sampling light pulses are emitted at a power between 0.1 mW and 50 mW, preferably between 1 mW and 10 mW.

In a preferred embodiment of the invention, the pumping signal is emitted at a power between too mW and 3000 mW, preferably between 400 mW and 1000 mW.

A further aspect of the invention relates to a method of determining a change in absorption in a fiber optic transmission system using an optical time domain reflectometer (OTDR), wherein the method comprises a step of detecting a change in reflected power in an OTDR measurement carried out in the fiber optic transmission system, a step of determining whether the detected change is mainly due to an attenuation event or to a change in the mode field diameter in the fiber optic transmission system according to the method of any of the embodiments described above, and a step of determining the change in absorption based on the detected change in reflected power and on whether the detected change is mainly due to an attenuation event or due to a change in the mode field diameter of the fiber optic transmission system.

This aspect of the invention hence allows not only determining whether a detected change in absorption in an OTDR measurement is mainly due to true attenuation events or to a change in the mode field diameter in the corresponding fiber optic transmission system, but also using this information to accurately determine the actual change in absorption, namely the change in absorption once the possible contribution of a change in the mode field diameter is taken properly into account. This way, an estimate for the actual absorption loss experienced by optical signals transmitted through the fiber optic transmission system can be obtained from the corresponding OTDR trace. Advantageously, this provides a novel way of measuring fiber attenuation by means of unidirectional OTDR measurements in fiber optic transmission systems that are not suitable for other kinds of OTDR measurements for the reasons explained above, and which may be implemented in an already installed fiber optic transmission system.

A further aspect of the invention relates to an optical time domain reflectometer (OTDR) configured for determining a change in absorption in a fiber optic transmission system, said OTDR comprising a light source configured for emitting a succession of sampling light pulses into the fiber optic transmission system, a light receiver configured for detecting reflected light pulses resulting from the reflection of the sampling light pulses in the fiber optic transmission system and for generating a corresponding OTDR trace from the reflected light pulses, and a processing unit operatively connected to the light receiver and the light source. The processing unit is configured for:

controlling the light source to emit a succession of first sampling light pulses of a first wavelength into the fiber optic transmission system and controlling the light source or a pumping arrangement to emit a pumping signal with a second wavelength into the fiber optic transmission system, and controlling the light receiver to measure a first OTDR trace resulting from the reflection of the first sampling light pulses in the fiber optic transmission system received by the light receiver; such that the first sampling light pulses and their reflections interact with the pumping signal via stimulated Raman scattering;

detecting a change in reflected power in the first OTDR trace; and determining whether the detected change is mainly due to an attenuation event or to a change in the mode field diameter in the fiber optic transmission system according to the method of any of the embodiments described above, and/or determining the change in absorption based on the detected change in reflected power and on whether the detected change is mainly due to an attenuation event or to a change in the mode field diameter of the fiber optic transmission system.

As explained above, the possibility of distinguishing whether a detected change in reflected power in an optical time domain reflectometer (OTDR) measurement is caused by actual localized attenuation of a propagating lightwave or by a change in a mode field diameter in a fiber optic transmission system is based on the fact that the strength of the nonlinear interactions, in particular stimulated Raman scattering, between the sampling light pulses and the pumping signal depends on the root cause of the change of the detected power. In preferred embodiments, the first wavelength is larger than the second wavelength, such that the sampling light pulses are Raman amplified by the pumping signal. Thus, sensitivity of the OTDR device is even improved. Alternatively, the first wavelength can also be smaller than the second wavelength such that the sampling light pulses experience depletion by the pumping signal. In other words, the sampling light pulses experience excess loss that can be described as a negative Raman gain. The magnitude of this negative Raman gain depends on the type of the event (actual attenuation or change of mode field diameter) in the same way as the positive Raman gain does. Thus, the same methods can be applied for analysis. However, sensitivity is smaller as compared with the configuration wherein the first wavelength is larger than the second wavelength.

The processing unit may be configured for inducing the emission of the pumping signal into the fiber optic transmission system by controlling the light source to do so or, alternatively, by controlling a pumping arrangement to do so, wherein the pumping arrangement may be located outside the OTDR. In this case the processing unit is further operatively connected to said pumping arrangement.

According to a preferred embodiment of the invention, the processing unit is further configured for:
controlling the light source to emit a succession of second sampling light pulses of the first or second wavelength into the fiber optic transmission system and controlling the light receiver to measure a further OTDR trace resulting from the reflection of the second sampling light pulses; and
detecting a change in reflected power in the first OTDR and the further OTDR trace.

Note that the processing unit is configured for controlling the light source to emit a succession of second sampling light pulses of the first wavelength or of the second wavelength into the fiber optic transmission system and measuring a further OTDR trace resulting therefrom. Hence said succession of sampling light pulses may correspond to the second or to the third succession of sampling light pulses of some of the embodiments described above and the further OTDR trace may correspond to the second or third OTDR traces of the embodiments described above.

In a preferred embodiment of the invention, the OTDR further comprises a second light receiver, wherein the light receiver and a second light receiver are configured for detecting reflected light pulses of different wavelengths. This way, the two light receivers may respectively be configured for detecting reflected light pulses of the first and second wavelengths. This allows the OTDR and measuring an OTDR trace resulting from the reflection of a succession of sampling light pulses of the first wavelength and measuring the OTDR trace resulting from the reflection of a succession of sampling light pulses of the second wavelength to be carried out simultaneously.

According to preferred embodiments of the invention, the light source is configured for emitting the first and second sampling light pulses with a wavelength difference between the first and a second wavelength between 20 nm and 110 nm, preferably between 40 nm and 100 nm.

In a preferred embodiment of the invention, the light source is configured for emitting at least one of the first, second, and/or third sampling light pulses at a wavelength of between 1400 nm and 1510 nm, preferably between 1420 nm and 1450 nm. In other words, at least one of the first and second wavelengths corresponds to the aforementioned wavelength ranges.

According to preferred embodiments of the invention, the light source is configured for emitting at least one of the first, second, and third sampling light pulses at a power between 0.1 mW and 50 mW, preferably between 1 mW and 10 mW.

According to preferred embodiments of the invention, the light source is configured for emitting the pumping signal at a power between too mW and 3000 mW, preferably between 400 mW and 1000 mW.

DESCRIPTION OF THE PREFERRED EMBODIMENTS

Figure 1:
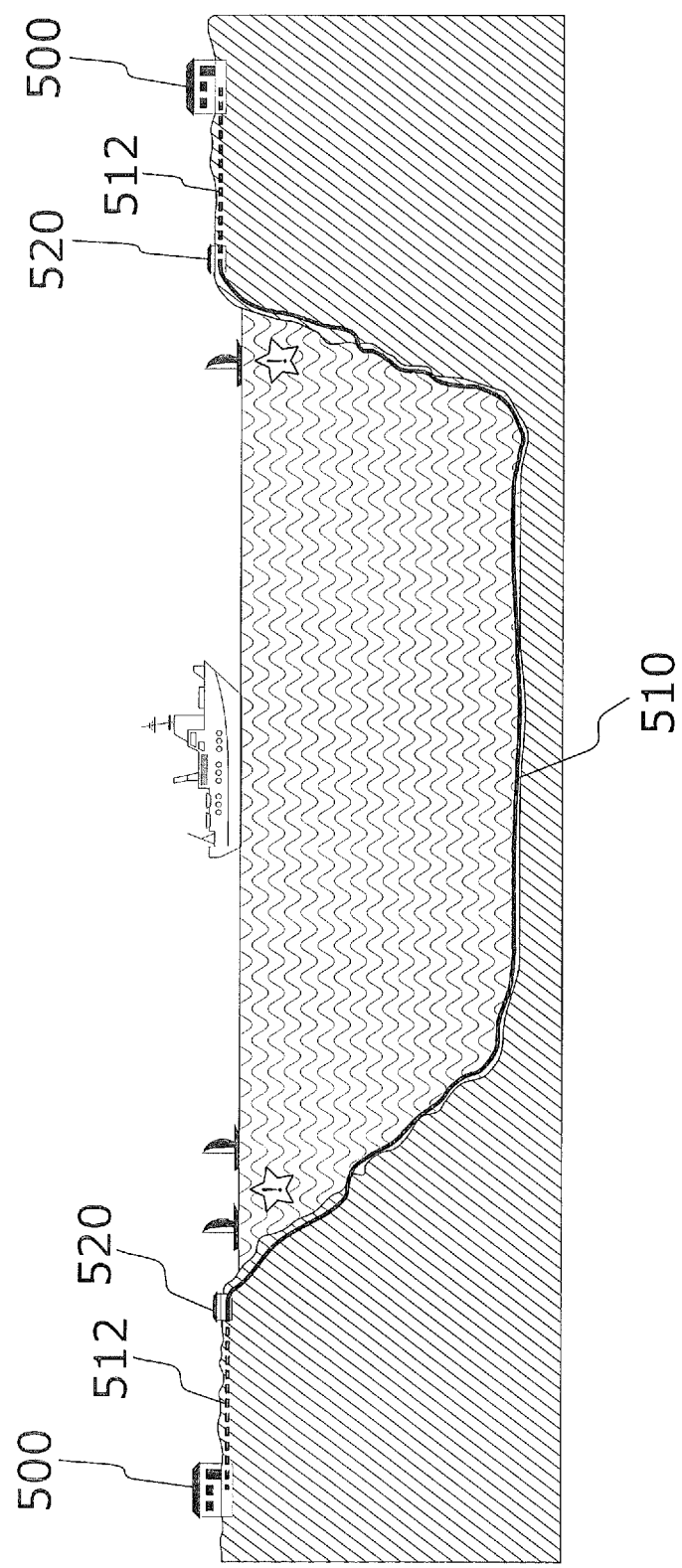
FIG. 1 illustrates a single span submarine optical link.

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

FIG. 1 shows a typical single-span submarine fiber optic transmission system with a submarine cable 510 carrying several optical fibers with uniform characteristics. The length of a submarine cable 510 typically amounts to 300 km or more. The submarine cable 510 provides a connection between terminal equipment sites 500, which are placed remote from landing stations 520, at which the submarine cable 510 is connected to a terrestrial cable 512 that covers the distance between the landing station 520 and the terminal equipment 500. The length of the terrestrial cable 512 is typically about 10 km to 15 km. The type of fiber used for terrestrial cables 512 is typically different from the type of fiber used for submarine cables 510, which is usually associated with a change in the mode field diameter at the corresponding fiber connection points.

Figure 2:
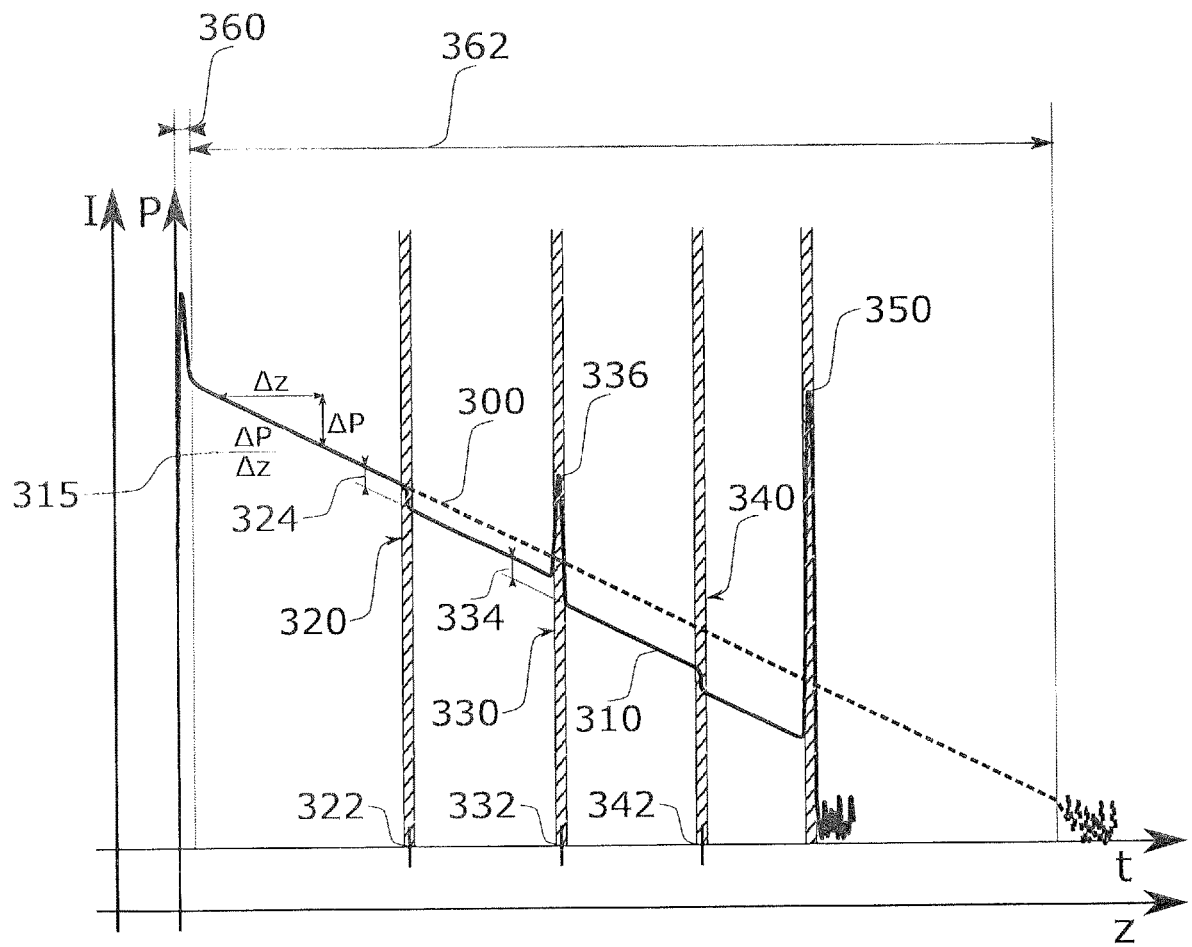
FIG. 2 shows a typical unidirectional OTDR trace of a fiber optic transmission system comprising a single type of fiber.

FIG. 2 shows a typical OTDR trace 300 for a fiber optic transmission system comprising a single type of fiber without any intermediate splices or connectors. Power P reflected back to the input of the fiber optic transmission system to which the OTDR is connected is recorded versus time t. More precisely, time t denotes in the following the time that has elapsed from launching a pulse into the fiber optic transmission system. The power P is typically detected by means of a photodiode that produces a photocurrent I. The photocurrent I depends in a linear way from the incident power P and thus allows determining the power reflected back without complex mathematical operations. As typically done, the measured power levels are presented on a logarithmic scale. Thus, the exponential decay of the optical power within the optical fiber due to Rayleigh scattering manifests as a straight line. The peak close to the origin of the system of coordinates in FIG. 2 is caused by reflections at the connector connecting the OTDR measurement device to the fiber optic transmission system. Since the detection of this peak involves some saturation of the detector, a consecutive non-reflective event can only be detected if it is located outside of the dead zone 360.

The aim of OTDR measurements is to provide insight into the characteristics of a fiber optic transmission system. Thus, time t needs to be linked to the propagation distance z along the optical fiber. Therefore, it is assumed that the pulse propagates with constant velocity v up to position z where it is reflected. After reflection, the pulse propagates back with the same velocity to the OTDR measurement device. This said, power P detected at time t has been reflected after propagation distance z=v*t/2. Velocity v is in most cases not known exactly, but its variation among different types of fibers is small enough to use a constant value for all types of transmission fibers. With this relation, characteristics of the fiber optic transmission system can be derived from a time resolved measurement of the reflected power.

The power detected by the OTDR depends on twice the cumulative attenuation up to the point of reflection z and the strength of the reflection. Relevant information is derived from the relative decrease of the reflected power from one position along the fiber to the next position. Absolute power levels are not of importance for the analysis and knowledge of the reflection coefficient is not required.

Trace 310 reveals details of a fiber optic transmission system with three events 320, 330, and 340. The first event 320 after propagation distance 322 is a splice causing attenuation 324 to the forward propagating lightwave that adds to the distributed loss caused by Rayleigh scattering. In particular, the drop of power 324 apparent in the trace corresponds to twice the power drop experienced by the forward propagating lightwave. This is due to the fact that the lightwave transverses the splice twice, first in forward direction and next, after reflection, in backward direction. However, OTDR traces are typically presented in such a way that only half of the decrease of the reflected power is shown and that the drop of power shown in the trace corresponds directly to the loss of a forward propagating lightwave. Further away from the input of the fiber optic transmission system, a second event 330 is detected after propagation distance 332. The peak 336 indicates that the event causes reflection besides the additional loss 334. This behaviour corresponds most likely to an optical connector with degraded contact surfaces, since splices typically do not cause reflection. Furthermore, there is a second splice 340 after propagation distance 342. In summary, known OTDR technologies provide accurate results for the attenuation characteristics if the reflection coefficient is constant along the fiber optic transmission system. Furthermore, the position of events can be determined accurately assuming that the velocity of pulse propagation corresponds to a preset value. In addition, an open connector at the other end of the fiber optic transmission system leads to a peak 350 since the significant difference of the index of refraction of an optical fiber and the index of refraction of air gives rise to strong reflections.

By using an OTDR, attenuation characteristics of the fiber optic transmission system can be determined within the measurement range 362. Typically, the measurement range 362 is limited by the leading dead zone and the sensitivity of the detector. In other words, the end of the measurement range 362 is determined by noise that is superimposed to the reflected signal. The slope 315 of the OTDR trace 310 between two events corresponds to the attenuation coefficient of the fiber and indicates the attenuation experienced by a lightwave propagating within the transmission fiber per propagation distance.

Figure 3:
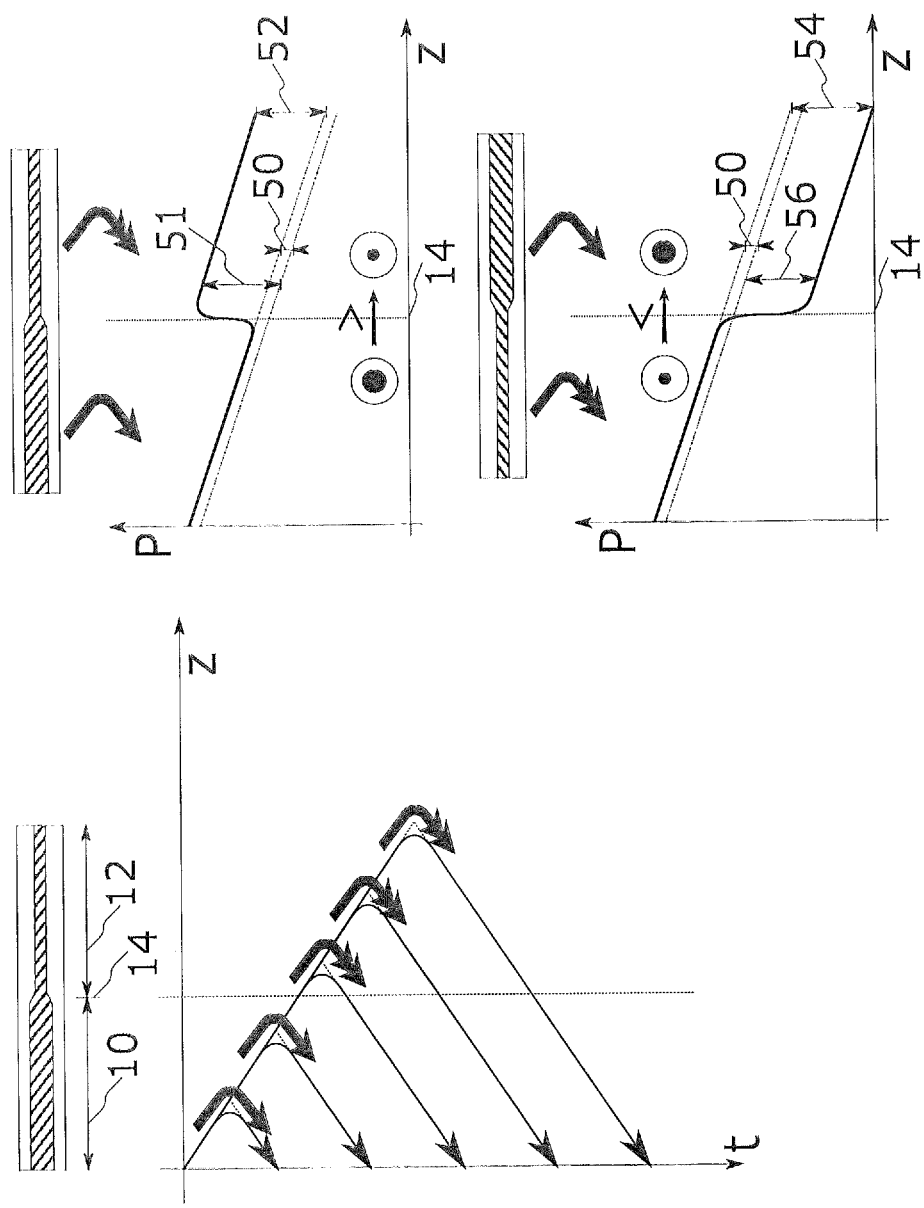
FIG. 3 shows gainers and exaggerated loss obtained in unidirectional OTDR traces resulting from a transition between fiber types of different mode field diameters.

FIG. 3 shows a connection 14 between a first fiber 10 and a second fiber 12 of different fiber types, i.e. fibers having different mode field diameters, and further shows exemplary scenarios of how such a change in the mode field diameter affects the amount in reflected power of an OTDR measurement. The diagram on the left side shows the generation of back reflected signals along a fiber optic transmission system including a connection 14 between a first fiber 10 and a second fiber 12, wherein the first fiber 10 has a mode field diameter larger than that of the second fiber 12. Since the backscattering factor scales inversely with the square of the mode field diameter, the decrease in the mode field diameter at the connection 14 leads to an increase in the amount of reflected power as indicated by the double arrows. The corresponding OTDR trace is shown in the top drawing on the right-hand side. The increase in the reflected power is seen in the corresponding OTDR trace as an apparent gain 52 after the connection point 14. The apparent gain 52 is equal to the logarithmic increase 51 due to the change of the backscattering coefficient minus the actual loss 50 due to attenuation at the connection, i.e. a "true splice loss". In this example, the typical case wherein the increase of the backscattering coefficient significantly exceeds the actual loss is shown. Note that the presence or the amount of the actual loss 50 cannot be discerned from the OTDR trace by itself.

The bottom drawing on the right-hand side shows an OTDR trace corresponding to a transition from a smaller mode field diameter to a bigger one. An increase in the mode field diameter leads to a drop in the backscatter coefficient and hence to a reduction of the amount of reflected power detected in the OTDR trace. Consequently, a feigned increase of attenuation 56 is apparent in the OTDR trace that exceeds the actual loss 50 due to attenuation. Hence, the apparent exaggerated loss 54 comprising both loss contributions may result in the wrong report of a poor quality splice.

Figure 4:
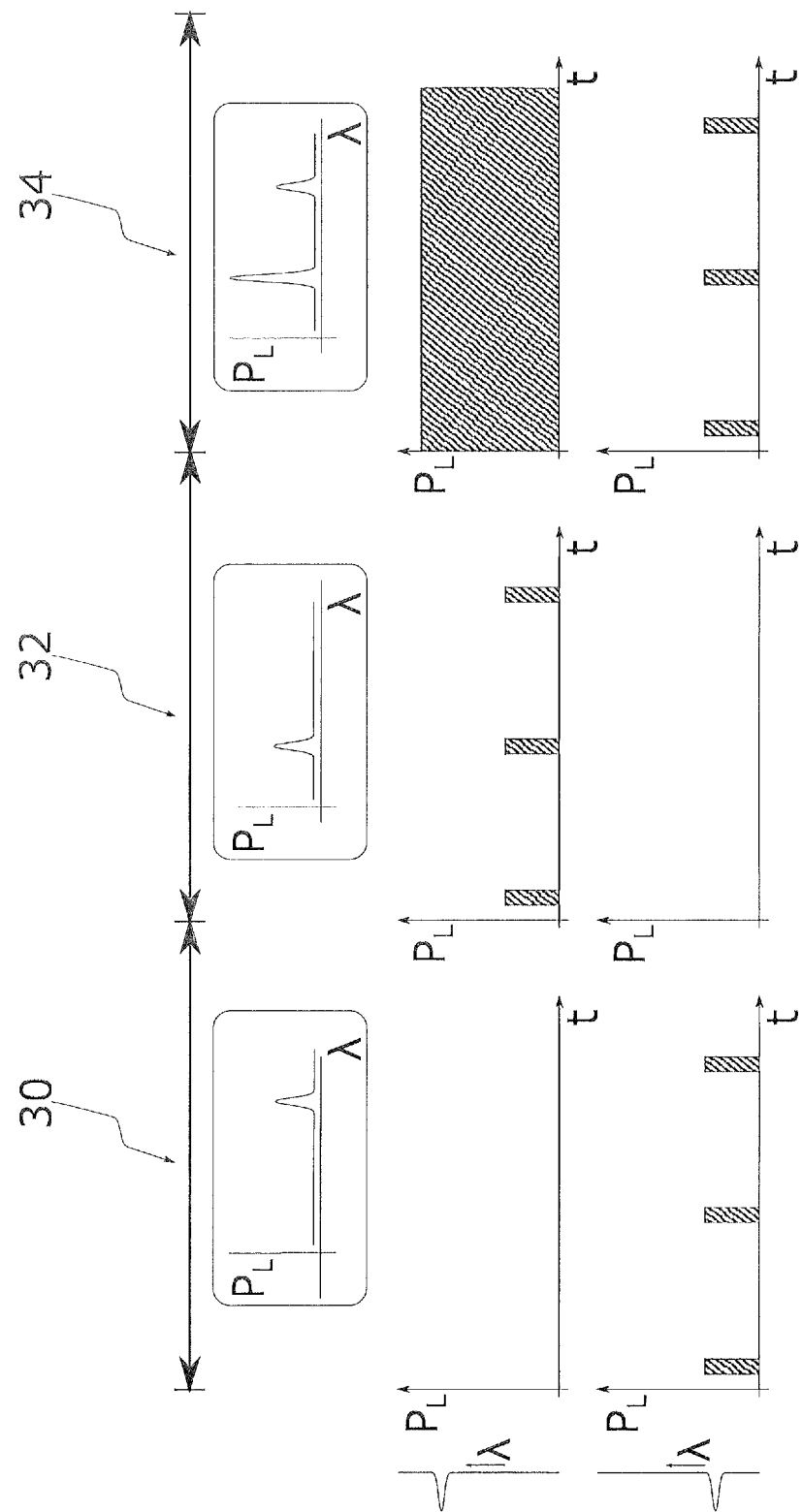
FIG. 4 shows a schematic representation of three steps of emitting a succession of sampling light pulses according to the method of an embodiment of the invention.

FIG. 4 shows a schematic representation of three steps of emitting a succession of sampling light pulses according to an embodiment of the invention. In particular, the power launched into the fiber at the first and the second wavelength is shown versus time t. The figure shows from left to right a first step 30 of emitting a succession of sampling light pulses of a first wavelength into a fiber optic transmission system, from which a corresponding OTDR trace is detected. In a second step 32, which may be carried out simultaneously with the first step 30, a succession of sampling light pulses of a second wavelength is emitted into the fiber optic transmission system. The first wavelength is larger than the second wavelength. In a subsequent step 34, a succession of sampling light pulses of the first wavelength is emitted into the fiber optic transmission system while a pumping signal with the second wavelength and with a continuous power is likewise emitted into the fiber optic transmission system. Since the first wavelength is larger than the second wavelength, the sampling light pulses of the first wavelength act as a probe during step 34, while the pumping signal of the second wavelength acts as a Raman pump that leads to Raman amplification of the first wavelength sampling light pulses. The steps 30, 32 and 34 may be carried out in any order.

In the embodiment shown, the wavelength difference between the first and second wavelength is of 90 nm. In particular, the first wavelength is 1530 nm and the second wavelength is 1440 nm. Please note that any wavelength difference between 20 nm and around 110 nm is suitable for the application. However, larger wavelength differences lead to a larger Raman gain and thus to improved sensitivity and accuracy of the measurement technique. The sampling light pulses emitted into the fiber optic transmission system during method steps 30, 32 and 34 are emitted at a power of 10 mW. The pumping signal emitted into the fiber optic transmission system during method step 34 is emitted at a power of 500 mW.

Figure 5:
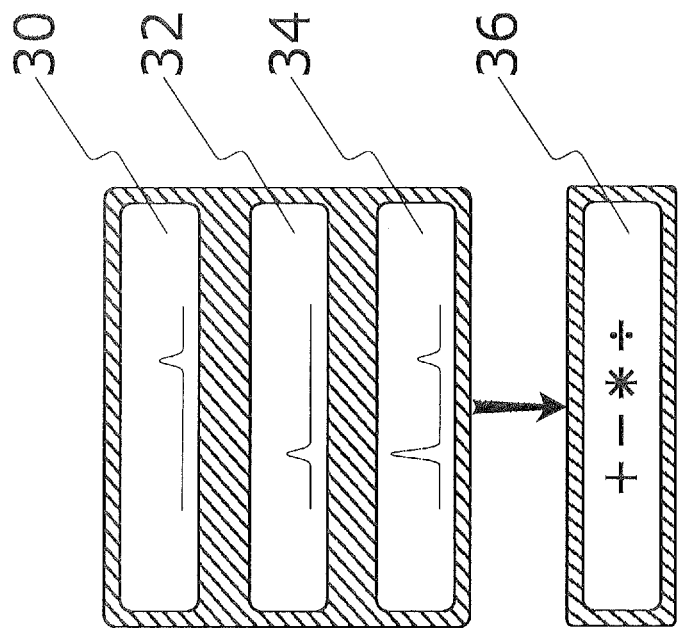
FIG. 5 shows a schematic representation of OTDR traces obtained during the execution of the method of FIG. 4 and different steps thereof.
Figure 5:
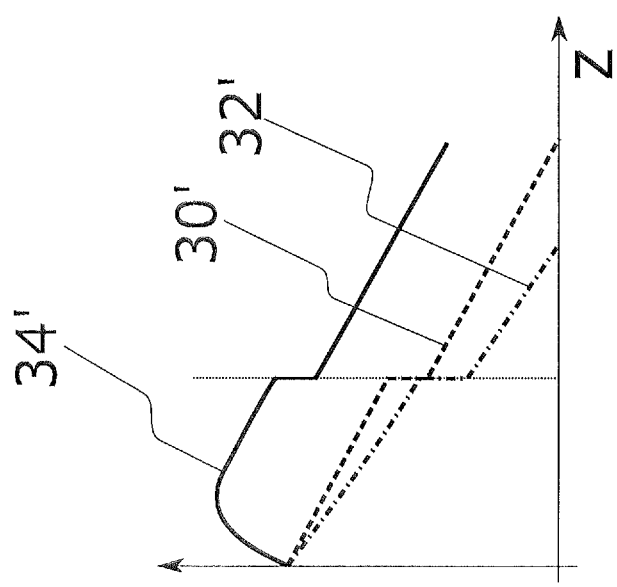

A schematic view of the corresponding OTDR traces as measured during steps 30, 32, and 34 is shown on the left-hand side of FIG. 5. The right-hand side of FIG. 5 shows a scheme of the method of FIG. 4 according to an embodiment of the invention in which the three steps 30, 32, and 34 of emitting successions of sampling light pulses into the fiber optic transmission system are followed by a step 36 of determining, based on the information extracted from the previously obtained OTDR traces, whether the detected change is mainly due to an attenuation event or to a change in the mode field diameter in the fiber optic transmission system. According to an aspect of the invention described above, step 36 may also comprise the process of determining the change in absorption based on the detected change in reflected power and on whether the detected change is mainly due to an attenuation event or to a change in the mode field diameter, in order to obtain a corrected estimate of absorption in the fiber optic transmission system. In addition, the analysis step 36 may comprise estimating the respective contributions of an attenuation event and change in the mode field diameter to the detected change in reflected power.

The left-hand side of FIG. 5 shows the OTDR traces 30', 32', and 34' obtained from the sampling light pulses sent into the fiber optic transmission system respectively during the steps 30, 32, and 34. The vertical dotted line indicates the location within the fiber optic transmission system at which a change in reflected power in the OTDR measurements is detected. At this point, all OTDR traces 30', 32', and 34' reveal a drop in reflected power. The OTDR traces 30' and 32' reflect the continuous decrease in reflected power due to attenuation in the fiber optic transmission system as a linear decay (on a logarithmic scale) with fiber distance, and further reflect a sudden drop in reflected power experienced at the aforementioned location. The OTDR trace 34' has a more complicated form due to the effect of Raman amplification. The obtained form of the OTDR trace 34' results from the combined effect of absorption on the sampling light pulses of the first wavelength acting as a probe and of the reduced Raman amplification due to the absorption experienced by the pumping signal itself.

In the embodiment shown, the step 36 of determining whether the detected change is mainly due to an attenuation event or to a change in the mode field diameter is carried out by checking for consistency of the OTDR trace 34' with calculated model data comprising first model data representing a first scenario in which the change in reflected power is due to an attenuation event only, and second model data representing a second scenario in which the change in reflected power is due to a change in the mode field diameter only. Said first and second model data correspond in the embodiment shown to calculated predictions for the OTDR trace 34' under the corresponding scenario. The method step 36 further comprises comparing the OTDR trace 34' with said calculated predictions, which are shown in FIG. 6.

Figure 6:
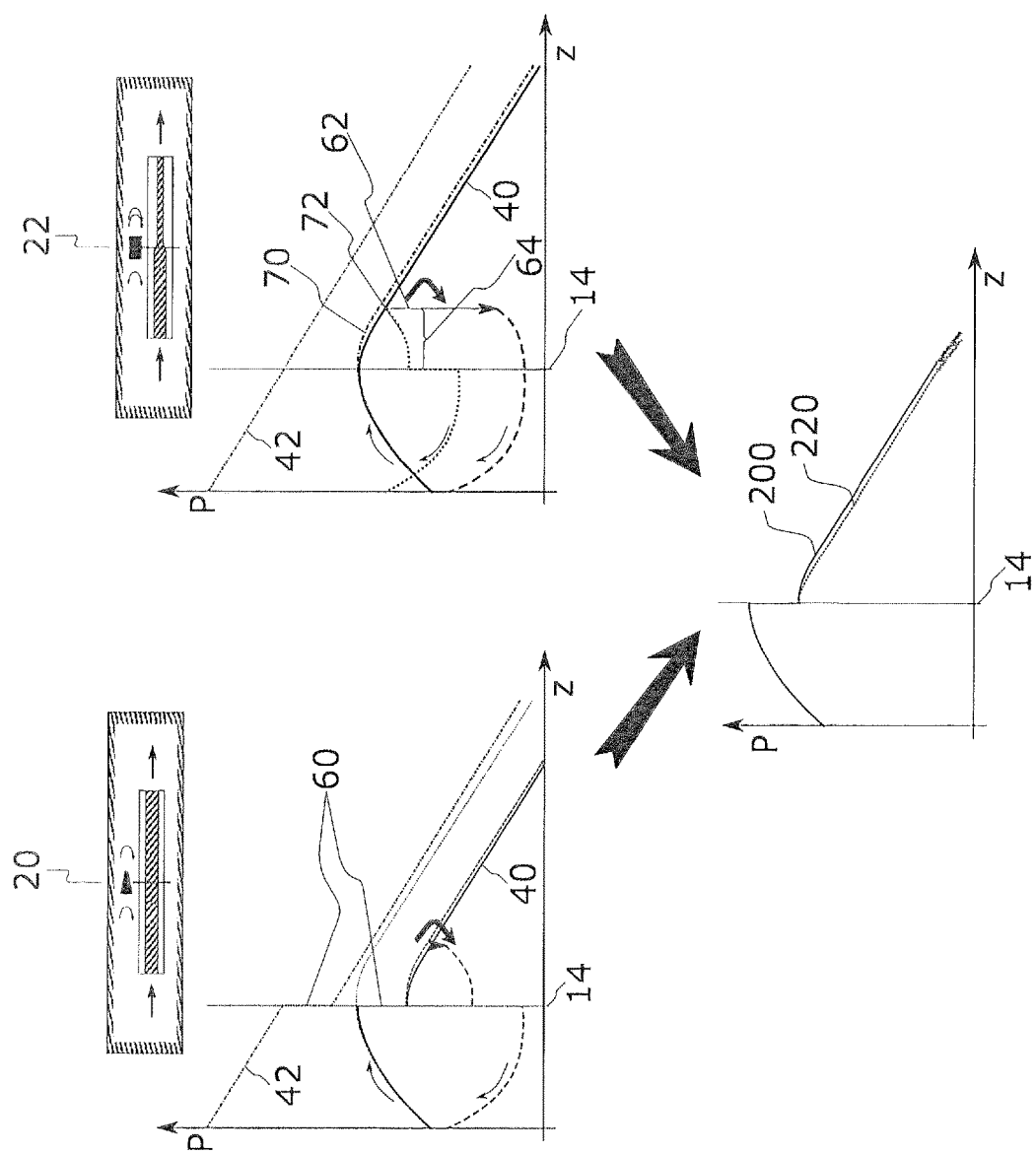
FIG. 6 shows a schematic representation of calculated predictions of the OTDR traces corresponding to the method of FIG. 4 and the consideration of a first and a second scenario according to an embodiment of the invention.

The upper plots of FIG. 6 show the power distribution of the forward propagating pumping signal 42 and the forward propagating sampling light pulses as well as the power distribution of the backward propagating sampling light pulses after reflection at position 15. For illustration purposes, reflection at a single point 15 is assumed, although the sampling pulses experience distributed reflection along the whole fiber. Furthermore, the upper plots of FIG. 6 illustrate the calculated predictions 40 for the OTDR trace 34' of FIG. 5 obtained for two scenarios representing extreme cases according to an embodiment of the invention. The left-hand side plot corresponds to a first scenario 20 in which the change in reflected power is entirely due to an attenuation event at the connection 14 of the fiber optic transmission system. In this first scenario 20, no change in a mode field diameter is assumed. In the first scenario, both the pumping signal 42 and the sampling light pulses experience an abrupt drop 60 in reflected power at the location of the connection 14 that is reflected in the corresponding prediction 40 for the OTDR trace 34'.

The right-hand side plot corresponds to a second scenario 22 in which no pure attenuation event (in excess of normal fiber attenuation) is assumed, but in which the mode field diameter changes abruptly due to a connection between different fiber types. The change in the Raman gain due to the different mode field diameter leads to a change in the hackscattering coefficient that affects the amount of back-reflected light and causes an abrupt power decrease 62 in reflected power. The dotted line 72 shows the power profile of reflected light that would result without the change in the back reflection coefficient due to the change in the mode field diameter. It must be noted that backreflected power components also experience Raman gain.

The bottom plot of FIG. 6 compares the predictions for the OTDR trace 34' resulting from the two considered scenarios. The first scenario 20, corresponding purely to an attenuation event, results in a predicted OTDR trace 200. The second scenario 22, corresponding to a pure change in the mode field diameter, results in a predicted OTDR trace 220. It can be seen that the OTDR trace 220 is below the OTDR trace 200 beyond the distinguished location 14. This can be understood by accounting for the corresponding values of the Raman gain experienced by the sampling light pulses under the first and second scenarios, which is involved in calculating the model data. The calculation of the model data can be carried out as follows:

First Scenario

Denoting as $P_{pump}^0$ the pump power right before location 14, the pumping power emitted into the fiber optic transmission system after location 14 is given by $$P_{pump}(z) = P_{pump}^0 \cdot \exp(-\alpha_{pump} z - a_{pump}) \quad (1)$$

where z is the position along the fiber optic transmission system, $\alpha_{pump}$ stands for the attenuation coefficient of the pumping signal in the second fiber 12 after connection 14, and $a_{pump}$ denotes the apparent loss in the OTDR trace for the pump signal. Both $\alpha_{pump}$ and $a_{pump}$ can be measured e.g. during step 32 of FIG. 4. Assuming that the depletion of the pump by the probe can be neglected, knowledge of the attenuation coefficient for the pumping signal in the first fiber 10 allows obtaining $P_{pump}^0$ straightforwardly from the launch power into the fiber optic transmission system.

The logarithmic Raman gain $G_{probe}(z)$ experienced by the sampling light pulses in the second fiber 12 is given by $$G(z) = \frac{P_{pump}^0 \cdot g_R^{II}}{A_{eff}^I} \cdot \frac{1}{\alpha_{pump}}[1 - \exp(-\alpha_{pump}z)] \cdot \exp(-a_{pump}) \quad (2)$$

where $g_R^{II}$ denotes the Raman gain coefficient in the second fiber and $A_{eff}^I$ stands for the effective mode field area of the first fiber 10, which in this first scenario 20 is identical to the effective mode field area $A_{eff}^{II}$ in the second fiber 12. Knowledge of the attenuation coefficients experienced by the sampling light pulses of the first wavelength (i.e. the probe light) allows using equation (2) for calculating the prediction 200 for the OTDR trace corresponding to the first scenario 20.

Figure 7:
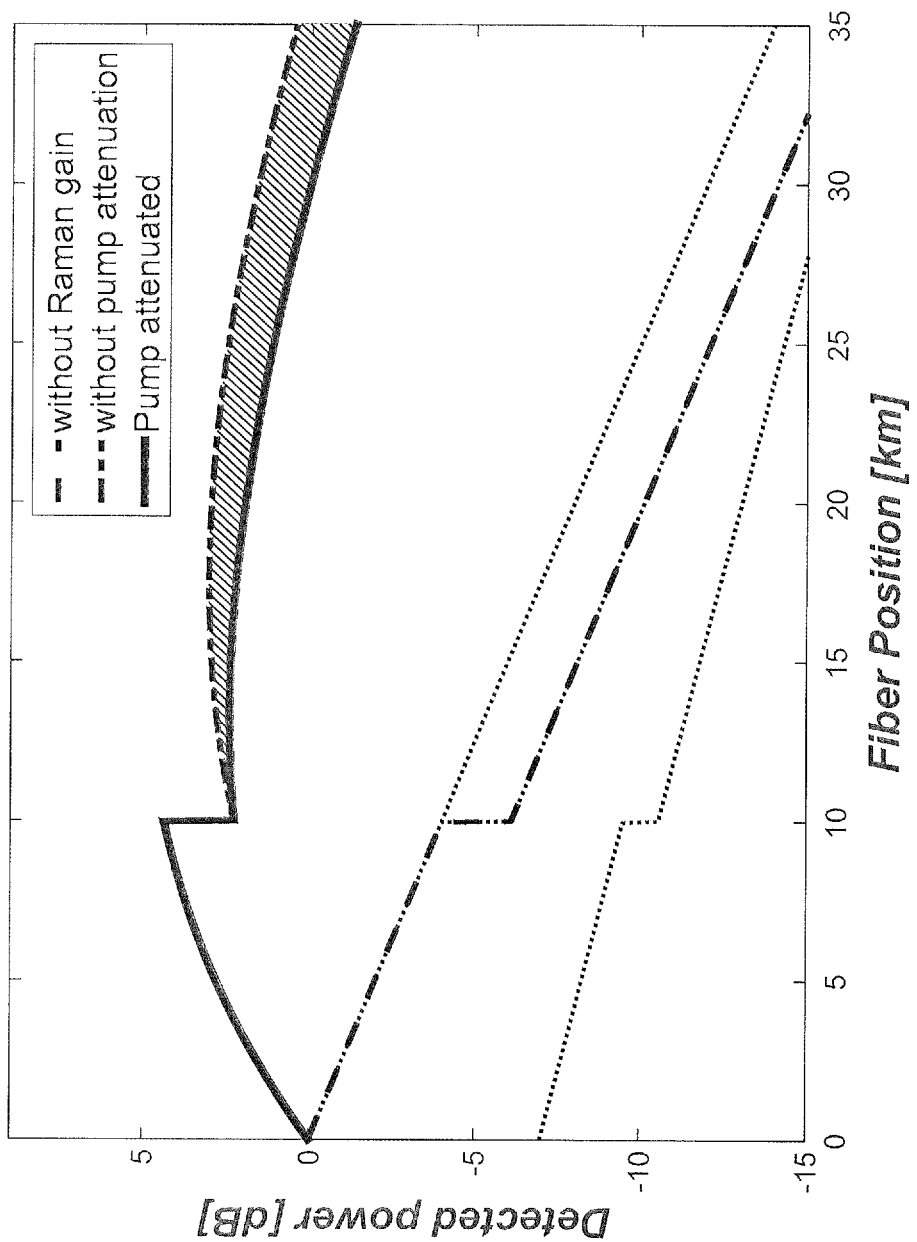
FIG. 7 shows an OTDR trace as a plot of detected power versus fiber position in a first scenario according to an embodiment of the invention, in which the change in reflected power is due to an attenuation event only.

FIG. 7 shows a plot of detected reflected power versus fiber position for the first scenario 20 assuming an attenuation for the pumping signal and the sampling light pulses at location 14 of 1 dB in a pure-silica-core fiber (PSCF) with an effective mode field area of 80 μm². Since power reflected after the splice at location 14, the curve shows an abrupt power drop of 2 dB. The three plotted lines represent in ascending order from bottom to top the detected power without Raman amplification (i.e. the detected power during method steps 30 or 32 of FIG. 5), the OTDR trace measured for the first scenario 20, and a hypothetical curve based on the assumption that the pumping signal does not suffer attenuation and the mode field diameter does not change.

Second Scenario

In the second scenario 22 it is assumed that no additional absorption by an attenuation event is experienced, neither by the pumping signal nor by the sampling light pulses. Instead, a change in the mode field diameter from a smaller to a larger mode field diameter, as shown in the lower figure on the right-hand side of FIG. 3 is assumed. The corresponding prediction for the OTDR trace will hence assume a unidirectional power drop experienced by the pumping signal $a_{pump}$ such that the detected reflected power would be expected to drop by $2a_{pump}$. From the theory of backscattering in optical fibers, it is known that the back reflection factor scales with the inverse of the effective mode field area. Therefore, the effective mode field area $A_{eff}^{II}$ of the second fiber 12 is given in this second scenario 22 by $$A_{eff}^{II} = A_{eff}^I \cdot \exp(2 \cdot a_{pump}) \quad (3)$$

such that the logarithmic Raman gain experienced by the sampling light pulses in the second fiber is given by $$G(z) = \frac{P_{pump}^0 \cdot g_R^{II}}{A_{eff}^I} \cdot \frac{1}{\alpha_{pump}}[1 - \exp(-\alpha_{pump}z)] \cdot \exp(-2 \cdot a_{pump}) \quad (4)$$

Figure 8:
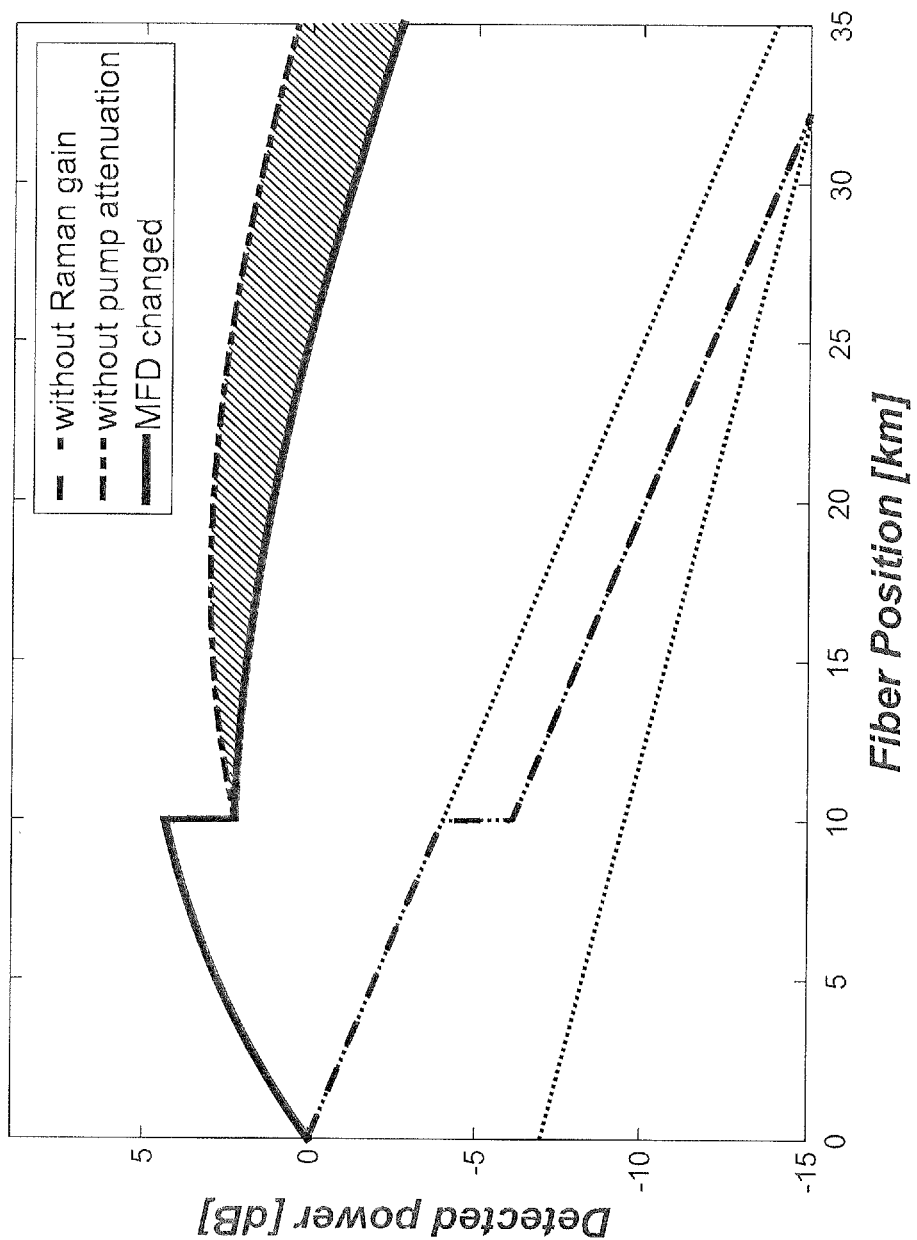
FIG. 8 shows an OTDR trace as a plot of detected power versus fiber position in a second scenario according to an embodiment of the invention in which the change in reflected power is due to a change in the mode field diameter only.

FIG. 8 shows a plot of detected reflected power versus fiber position for the second scenario 22 assuming that the location 14 corresponds to a connection between a PSCF with an effective mode field area of 80 μm² and another PSCF with an effective mode field area of 130 μm². It is further assumed that the Raman gain coefficient does not change. As expected from the considerations above, the decrease of the Raman gain is larger than for the first scenario 20 (cf. FIG. 7).

A comparison of equations (2) and (3) (and of FIGS. 7 and 8) readily reveals that the Raman gain experienced by the sampling light pulses in the second fiber 12 for the second scenario 22 is smaller than the corresponding gain in the first scenario 20, assuming that the Raman gain coefficient is independent of the fiber type or at least that the Raman gain coefficient increases with decreasing mode field area. The validity of this last assumption has been proved for most of the commercially available fiber types used in Raman amplified-based fiber-optic transmission systems (cf. reference [1]):

| | $A_{eff}$ [μm²] | $C_R * A_{eff}$ [$10^{-15}$*m/W] | $\alpha_{pump}$ [dB/km] |
|---|---|---|---|
| Truewave-RS ™ | 55 | 40.15 | 0.25 |
| TeraLight ™ | 65 | 39.00 | 0.27 |
| E-LEAF | 72 | 39.60 | 0.25 |
| LEAF ™ | 72 | 38.88 | 0.25 |
| Allwave ™ | 80 | 35.20 | 0.24 |
| SSMF | 80 | 33.60 | 0.25 |
| PSCF | 80 | 27.20 | 0.22 |

The variable $C_R$ stands for the Raman gain efficiency that depends on the Raman on-off-gain, the total Raman pump power and the effective length of the nonlinear interaction area.

Hence, the step 36 of determining whether the detected change in reflected power is mainly due to an attenuation event or to a change in the mode field diameter may be accomplished by estimating the Raman gain experienced by the second sampling light pulses by using the expression $$G(z) = \frac{P_{pump}^0 \cdot g_R^I}{A_{eff}^I} \cdot \frac{1}{\alpha_{pump}}[1 - \exp(-\alpha_{pump}z)] \cdot \gamma \cdot \exp(-\delta \cdot a_{pump}) \quad (5)$$

where $P_{pump}^0$ denotes the pump power before an attenuation event or a change in the mode field diameter, $g_R^I$ is the Raman coefficient of the fiber optic transmission system before said attenuation event or change in the mode field diameter, $A_{eff}^I$ stands for the effective mode field area of the fiber optic transmission system before said attenuation event or change in the mode field diameter, $a_{pump}$ is the change in absorption experienced at said attenuation event or change in the mode field diameter by the pump signal, $\alpha_{pump}$ is the attenuation coefficient of the pumping signal in the fiber optic transmission system after said attenuation event or change in the mode field diameter, z is the position along the fiber optic transmission fiber after said attenuation event or change in the mode field diameter, and $\gamma$ is the ratio of the Raman coefficients of the fiber optic transmission system before and after the attenuation event or change in the mode field diameter, $$\gamma = \frac{g_R^{II}}{g_R^I},$$

with $g_R^{II}$ being the Raman coefficient of the fiber optic transmission system after said attenuation event or change in the mode field diameter, wherein the first scenario 20 is characterized by a value of $\delta=1$, and wherein the second scenario 22 is characterized by a value $\delta=2$. The OTDR trace 34' can be mathematically fitted to the above expression. Apart from $\gamma$ and $\delta$, all parameters may be derived from the OTDR traces 30', 32', and 34'. In other words, while in this embodiment the OTDR trace 34' (i.e. the "first OTDR trace" referred to in the summary of the invention) is compared with the corresponding measured trace, still information from the OTDR traces 30', 32' is taken into account, such that the determination of the cause of change in reflected power is based on information extracted from at least two OTDR traces. However, as explained below, it is not always required to measure both traces 30' and 32' (i.e. the second and third OTDR traces referred to in the summary of the invention).

The value of the parameter δ providing the best fit to the OTDR trace 34' reveals, depending on whether it is closer to 1 or 2, whether the detected change in reflected power is mainly due to an attenuation event (case δ=1) or to a change in the mode field diameter (case δ=2). Moreover, a value of δ between 1 and 2 may indicate the respective contributions of the two causes of change in reflected power.

Figure 9:
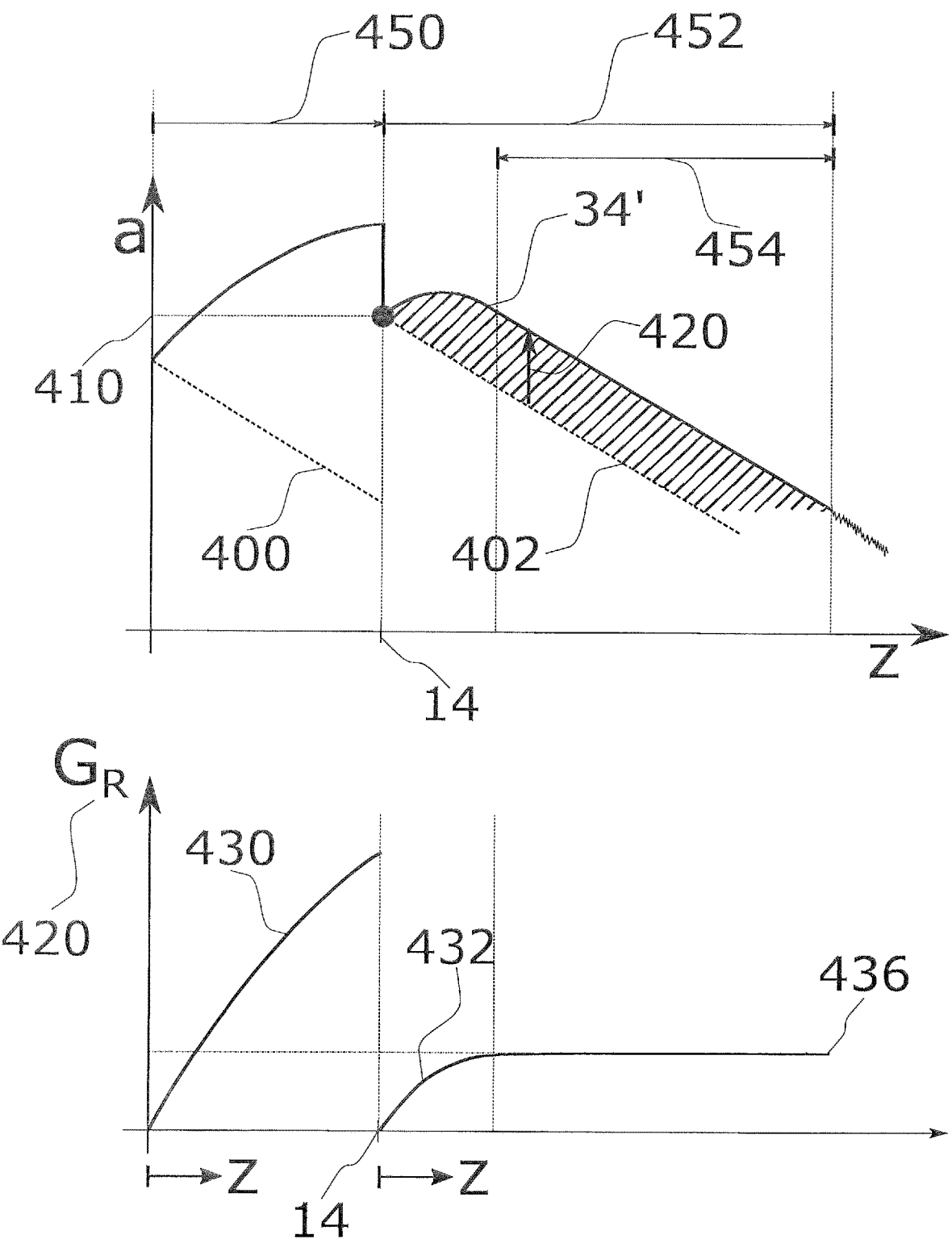
FIG. 9 illustrates the calculation of the gain and the fitting of the measurement results according to an embodiment of the invention.

The determination of the parameter δ according to equation (5) can be implemented in various ways. One possible approach is explained in the following by means of FIG. 9. For easier understanding, the fiber optic transmission system is split into two segments that are considered separately in the following. The first segment 450 extends from an input of the fiber optic transmission system to the location 14 of the considered event and the second segment 452 ranges from location 14 to an end of the fiber optical transmission system.

The Raman gain 420 experienced by the probe pulses within the respective segments of the fiber optic transmission system can be determined from the OTDR trace 34' by subtracting OTDR trace 400 or OTDR trace 402 that would be obtained for the respective segments without any Raman gain. When using linear figures instead of logarithmic units, a division has to be applied. The virtual OTDR traces 400 and 402 can be constructed very easily by starting from the attenuation 410 at the beginning of the respective segment and assuming exponential decay with the fiber attenuation coefficient derived from OTDR trace 30'. The resulting Raman gain curve is shown in the lower part of FIG. 9. Using the attenuation coefficient determined from trace 32' for the first segment, the factor $$\frac{P^0_{pump} \cdot g^I_R}{A^I_{eff}}$$

can be determined easily from the Raman gain 430 for the first segment by using well known fitting techniques. Please note that the fitting can also provide an estimate for the attenuation coefficient of the pumping signal. Thus, the OTDR trace 32' is not mandatory for the calculations. In the next step, the value of δ leading to an optimum fit of equation (5) to the Raman gain 432 in the second segment is determined. The fitting can for example be done in such a way that the root mean square (rms) of the error becomes minimum. Curve fitting is not always necessary. If the measurement range after the considered event is long enough for the (accumulated) Raman gain to reach a constant value 436

$$G_{final} = \frac{P^0_{pump} \cdot g^I_R}{A^I_{eff}} \cdot \frac{1}{\alpha_{pump}} \cdot \exp(-\delta \cdot a_{pump})$$

the parameter δ can be derived directly from this value.

One possible approach will be explained in the following. Therefore, it is assumed that the loss $a_{pump}$ apparent in the OTDR trace comprises a contribution $a_{pump,real}$ from the loss of the connection (e.g. the splice) and some contribution $a_{pump,MFD}$ from the change of the mode field diameter. As before, all losses are given in logarithmic units, so that the total loss apparent in the OTDR trace can be represented by $$a_{pump} = a_{pump,real} + a_{pump,MFD}. \quad (6)$$

Furthermore, from the combination of equations (2) and (4), the total Raman gain is given by $$G(z) = \frac{P^0_{pump} \cdot g^{II}_R}{A^I_{eff}} \cdot \frac{1}{\alpha_{pump}} [1 - \exp(-\alpha_{pump} z)] \cdot \quad (7)$$

$$\exp(-a_{pump,real}) \cdot \exp(-2a_{pump,MFD}).$$

Finally, the comparison of equations (5) and (7) results in $$a_{pump,real} + 2 \cdot a_{pump,MFD} = \delta \cdot a_{pump} \quad (8)$$

Taking into account equation (6), the actual loss can be expressed by $$a_{pump,real} = (2-\delta) \cdot a_{pump} \quad (9)$$

This equation indicates that an estimate for the actual loss experienced by a lightwave propagating within the optical fiber can be obtained from the total loss apparent from the OTDR trace and the fitting parameter δ used to fit the mathematical model according to equation (5) to the measurement data. For the two scenarios considered above, the actual loss calculated from the equation is indicated in the following table:

| First scenario | δ = 1 | $a_{pump,real} = \alpha_{pump}$ |
| --- | --- | --- |
| Second | δ = 2 | $a_{pump,real} = 0$ |

Determining the Raman gain requires knowing the attenuation coefficient for the first wavelength before and after the considered event. Maximum accuracy is achieved when deriving this information from trace 30'. However, acceptable results can also be achieved by using estimates for this parameter. For example, a typical relation between the attenuation coefficients at both wavelengths can be used. Although this approach may lead to reduced accuracy, it is still possible to differentiate between attenuation due to actual loss or due to a change of the mode field diameter. Furthermore, the attenuation coefficient for the first wavelength can also be derived from trace 34', for example in case the measurement range is larger than the effective length of the Raman interaction. In other words, the attenuation coefficient for the first wavelength can be derived from trace 34' in the range 454 with negligible Raman interaction.

In the approach described above, fitting is performed after trace 34' has been measured. However, it is also possible to pre-calculate traces for different sets of parameter values and to save them in a memory. Once a trace has been measured, it is compared with one of the saved traces and the one showing maximum similarity is selected. In this way, computational resources can be spared.

Once it has been determined whether the detected change in reflected power is mainly due to an attenuation event or to a change in the mode field diameter, this information may be used to obtain an estimate for the actual absorption loss that has led to the detected change in reflected power.

Figure 10:
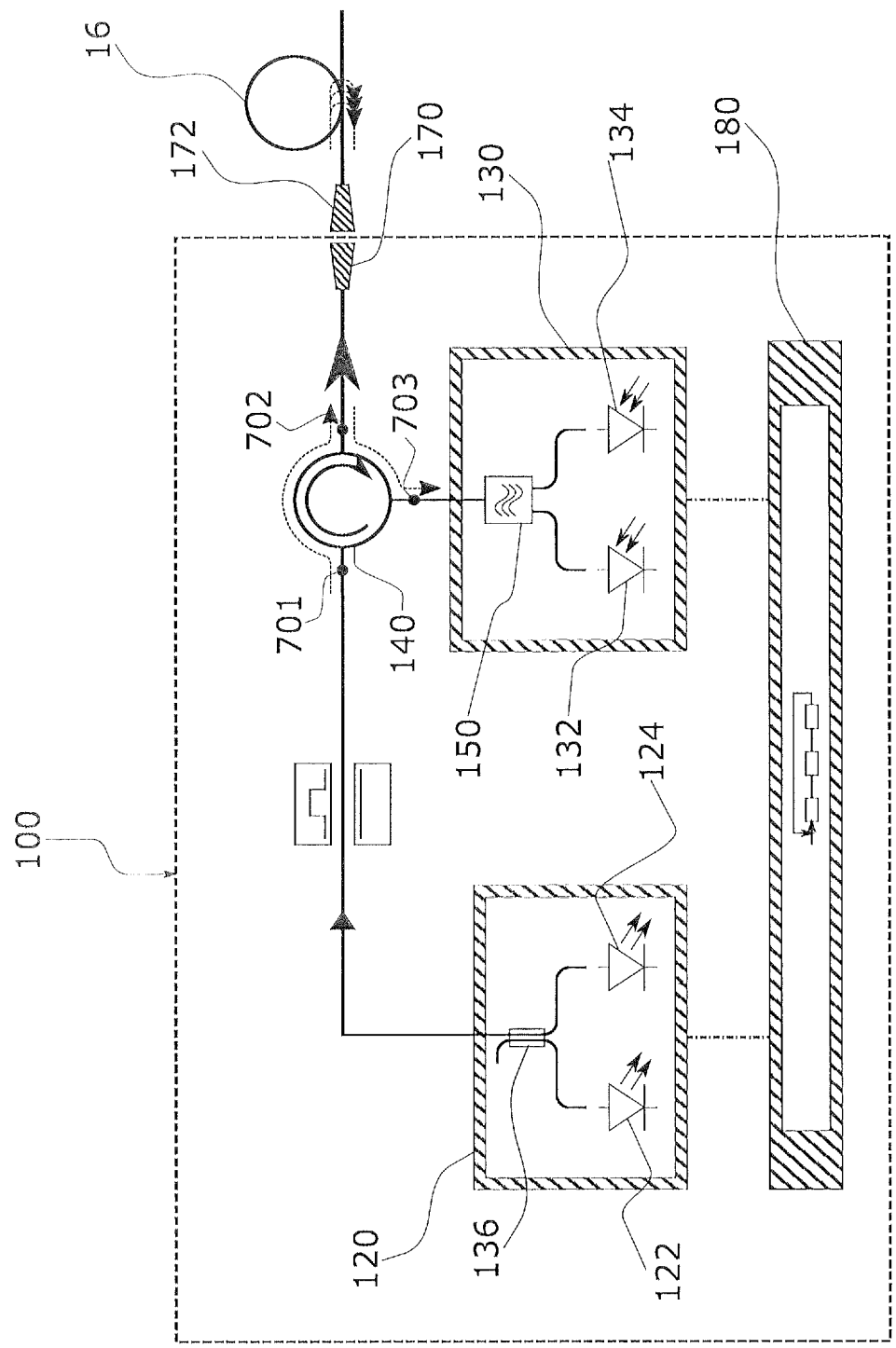
FIG. 10 shows an OTDR according to an aspect of the invention.

FIG. 10 shows an optical time domain reflectometer 100 configured for determining a change in absorption in a fiber optic transmission system according to an embodiment of the invention. The OTDR 100 comprises a light source 120, a light receiving device 130 comprising a first light receiver 132 and a second light receiver 134, a processing unit 180, a circulator 140, and a connector 170.

The light source 120 is configured for emitting a succession of sampling light pulses into the fiber optic transmission system 16 via a second connector 172 connected to the connector 170 of the OTDR 100. The sampling light pulses pass through the circulator 140 and are reflected in the fiber optic transmission system 16, resulting in reflected light pulses. The reflected light pulses circulate back to the circulator 140 and are directed to the light receiving device 130. The processing unit 180 is operatively connected to the light source 120, and to the light receiving device 130.

The processing unit 180 is configured for controlling the light source 120 to emit a succession of first sampling light pulses of a first wavelength into the fiber optic transmission system 16 and to emit a pumping signal of a second wavelength into the fiber optic transmission system, and for controlling the light receiving device 130 and/or components thereof to measure a first OTDR trace resulting from the reflection of the second sampling light pulses in the fiber optic transmission system received by the light receiving device 160.

Further, the processing unit 180 is configured for controlling the light source 120 to emit a succession of second sampling light pulses of the second wavelength into the fiber optic transmission system and for controlling the light receiving device 160 and/or components thereof to measure a second OTDR trace resulting from the reflection of the second sampling light pulses in the fiber optic transmission system received by the light receiving device 160.

In the embodiment shown, the transmission system 16 consists of one or more transmission fibers that are connected in series. However, the transmission system 16 might additionally comprise components such as splitters or couplers, and optical amplifier cards such as Raman pump cards. The light source 120 comprises a light emitting element 124 and a second light emitting element 122. These light emitting elements 122, 124 could be any kind of lasers, such as laser diodes and Raman fiber lasers. The radiation from the light emitting element 124 and the second light emitting element 122 is launched into one fiber via an optical combiner or splitter 136. In order to reduce coupling losses, a wavelength dependent combiner is preferably used. The light emitting element 124 emits light at a first wavelength, whereas the second light emitting element 122 emits radiation at a second wavelength.

The light receiving device 160 further comprises a wavelength dependent splitter 150 connected to the light receiver 132 and to the light receiver 134. The reflected light pulses passing through the circulator 140 are directed by the wavelength dependent splitter 150 to the light receiver 132 if they have the first wavelength or to the second light receiver 134 if they have a second wavelength. The first wavelength is larger than the second wavelength, such that the first sampling light pulses and their reflections may be Raman amplified by the pumping signal of the second wavelength.

The processing unit 180 is further configured for detecting a change in reflected power in an OTDR measurement carried out in a fiber optic transmission system 16, for determining whether the detected change is mainly due to an attenuation event or to a change in the mode field diameter in the fiber optic transmission system 16 according to any of the methods described herein, and for determining the change in absorption based on the detected change in reflected power and on whether the detected change is mainly due to an attenuation event or to a change in the mode field diameter of the fiber optic transmission system.

In the embodiment shown, the light source 120 is configured for emitting successions of first and second sampling light pulses having respectively a wavelength of 1440 nm and 1530 nm. Further, the light source 120 is configured for emitting the sampling light pulses at a power of 10 mW, and for emitting the pumping signal at a power of 500 mW. The first light emitting element 122 may comprise several light emitting elements providing lightwaves at different wavelengths for generating Raman amplification in the optic transmission system.

The term "circulator" as used herein stands for a device directing a lightwave coupled into a first port 701 to a second port 702, whereas a lightwave coupled into the second port 702 is directed to a third port 703. In this context, "port" denotes a point related to a device where a waveguide, in particular an optical fiber, connects to the device. Typically, optical circulators are based on the Faraday effect, but the term circulator as used herein is not limiting with respect to the technology used. In this definition, directing a lightwave from a first port to a second port does not exclude that part of the power of this lightwave is emitted from other ports of the device. For example, it is also possible to use a splitter and to block reflected light exiting the device at port 701 by inserting an isolator.

Figure 11:
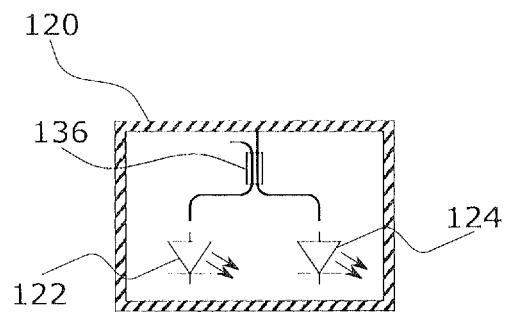
FIG. 11 shows different designs of a light receiver according to embodiments of the invention.
Figure 11:
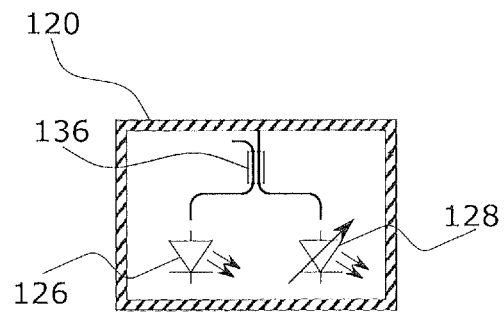

FIG. 11 shows two designs for the light source 120 that can be used in the embodiment of FIG. 10. FIG. 11a shows the light source illustrated in FIG. 10 with two light emitting elements emitting lightwaves at fix wavelengths. The lightwave emitting element 124 emits pulses at the first wavelength, whereas the second light emitting element 122 emits pulses at the second wavelength. With this design, measurements according to the first measurement phase 30 and the second measurement phase 32 can be done sequentially in arbitrary order but also simultaneously. When using the setup according to FIG. 11b, pulses at both wavelengths are emitted sequentially at the first and second wavelengths by the light emitting element 128 having tunable wavelength. Using this setup, measurements according to the first measurement phase 30 and the second measurement phase 32 are performed sequentially. The light emitting element 126 is configured for providing high constant output power at the second wavelength. The functionality of the involved light emitting elements is summarized in the following table.

|  | Light source according to FIG. 11a | | Light source according to FIG. 11b | |
| --- | --- | --- | --- | --- |
|  | Light emitting element 122 | Second light emitting element 124 | Light emitting element 126 | Second light emitting element 128 |
| First measurement phase 30 |  | Pulse at first wavelength |  | Pulse at first wavelength |
| Second measurement phase 32 | Pulse at second wavelength |  |  | Pulse at second wavelength |
| Third measurement phase 34 | Constant power at second wavelength | Pulse at first wavelength | Constant power at second wavelength | Pulse at first wavelength |

-continued

| | Light source according to FIG. 11a | | Light source according to FIG. 11b | |
|---|---|---|---|---|
| | Light emitting element 122 | Second light emitting element 124 | Light emitting element 126 | Second light emitting element 128 |
| Comments | First measurement phase 30 and second measurement 32 phase can done simultaneously | | First measurement phase 30 and second measurement 32 phase are done sequentially | |

Figure 12:
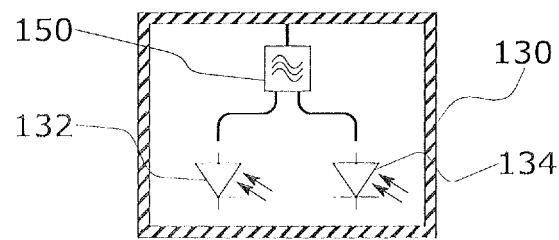
FIG. 12 shows different designs of a light source according to embodiments of the invention.
Figure 12:
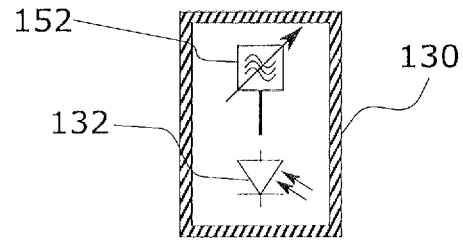

In a further embodiment, the light receiving device 130 contains a single light receiver 132. Furthermore, the light receiving device 130 is configured for selectively detecting lightwaves at different wavelengths. The selection of the appropriate wavelength is either achieved by using a light receiver already providing wavelength selectivity, such as a coherent receiver, or by placing a tunable bandpass filter 152 in front of the light receiver 132. Such a receiver design is shown in FIG. 12b, whereas the design according to FIG. 10 is displayed in FIG. 12a. Any of the designs shown in FIG. 12 can be used in the embodiment of FIG. 10.

Figure 13:
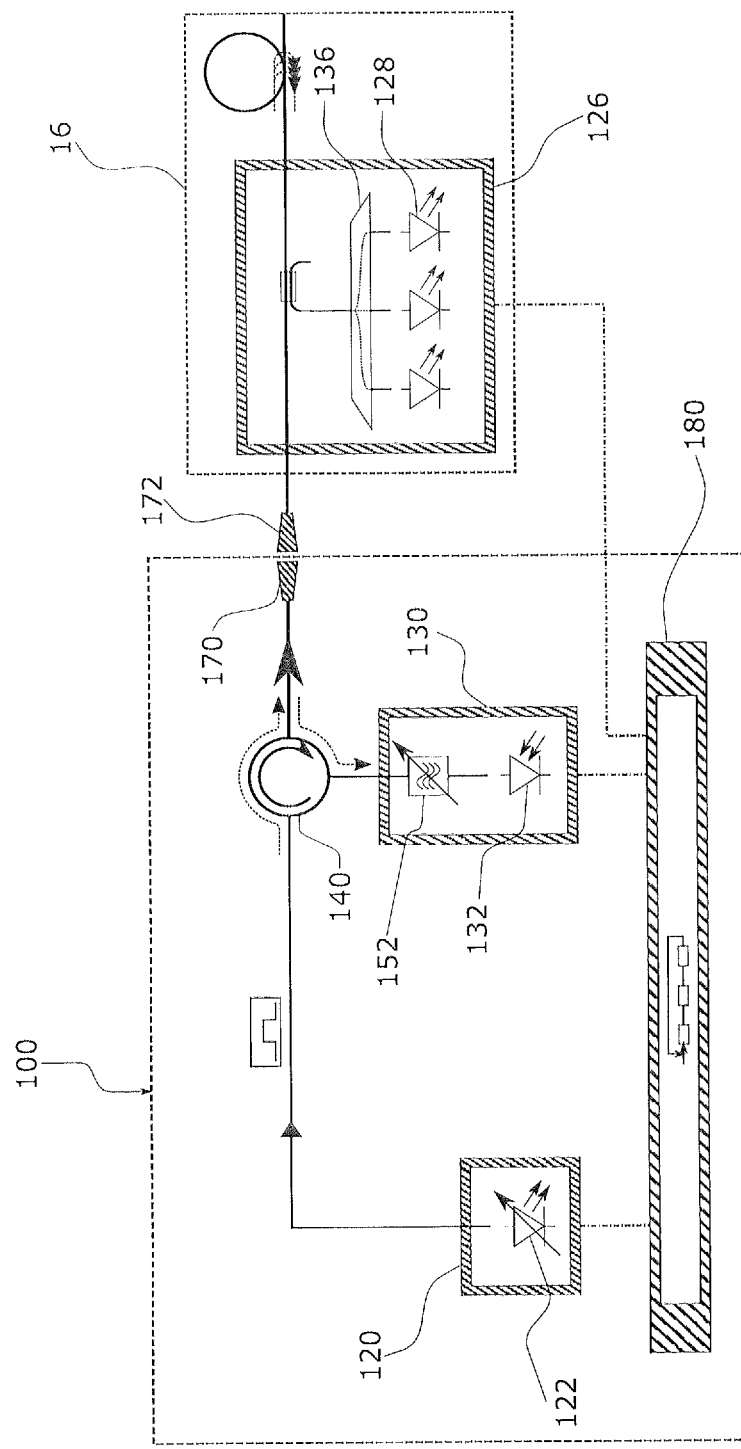
FIG. 13 shows an OTDR according to an embodiment of the invention making use of an external pumping arrangement.

FIG. 13 shows a further embodiment wherein the OTDR 100 comprises a light source 120 with a single light emitting element 122 and wherein the OTDR 100 is operatively connected to a Raman pumping arrangement 126. In the shown example, the Raman pumping arrangement 126 consists of several laser diodes 138 emitting pump power at different wavelengths and a wavelength selective pump combiner 136. The light emitting element 122 is tunable in wavelength and is capable of emitting pulses at the first wavelength and at the second wavelength. Furthermore, the Raman pumping arrangement 126 is instructed either manually or automatically (e.g. by the processing unit 180) to turn on during the third measurement phase 34. The light receiving device 130 is set up according to FIG. 12b and detects pulses at both the first and the second wavelength. However, it is also possible to use the receiver setup of FIG. 12a. Furthermore, it is also possible to use a light emitting element 122 with fix wavelength emitting pulses at the first wavelength. In this case, the Raman pump source is configured to emit pulses at the second wavelength.

The previous explanations show that measuring both OTDR traces 30' and 32' is not always necessary. Furthermore, traces 30' and 32' can be measured sequentially, but also simultaneously if the selected transmitter and receiver design support such a mode of operation.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

REFERENCES

[1] S. Jiang et al, "Full characterization of modern transmission fibers for Raman amplified-based communication systems", Optics Express, vol. 25, no. 8, April 2007.

REFERENCE SIGN LIST 10 first fiber
12 second fiber
14 connection between first fiber and second fiber
15 reflection point
16 fiber optic transmission system
20 first scenario
22 second scenario
30, 30' first measurement phase and corresponding OTDR trace
32, 32' second measurement phase and corresponding OTDR trace
34, 34' third measurement phase and corresponding OTDR trace
36 analysis phase
40 OTDR signal
42 pumping signal
50 actual loss/attenuation
51 increase of reflected power due to increase of backscattering coefficient
52 apparent gain
54 apparent exaggerated loss
56 feigned increase in attenuation due to change of backscattering coefficient
60 abrupt decrease of power due to an attenuation event
62 abrupt power decrease due to change of back reflection coefficient
64 region with reduced Raman gain due to larger mode field area
70 power profile for uniform fiber without attenuation events
72 power profile without change of backreflection coefficient
100 OTDR
120 light source
122 light emitting element
124 second light emitting element
126 Raman pumping arrangement
128 tunable laser diode
130 light receiving device
132 light receiver
134 second light receiver
136 combiner
138 laser diode
140 circulator
150 wavelength dependent splitter
152 tunable bandpass filter
170, 172 connector
180 processing unit
200, 220 predicted OTDR trace
300 OTDR trace without intermediate events
310 OTDR trace with events across the optic fiber transmission system
315 slope of OTDR trace
320, 330, 340 event (splice or connector)
322, 332, 342 position of event (propagation distance)
324, 334 additional loss, drop of power
336, 350 peak
360 dead zone
362 measurement range
400, 402 virtual OTDR trace constructed for situation without Raman amplification
410 attenuation at input of segment
420 Raman gain
430 Raman gain in first segment
432 Raman gain in second segment
436 final value of Raman gain
450, 452 segments of fiber optic transmission system
454 range with negligible Raman interaction
500 terminal equipment
510 submarine cable 512 terrestrial cable
520 landing station
701, 702, 703 Ports of a circulator
a attenuation
$G_R$ Raman gain
I photocurrent
P power
$P_L$ launch power
t time
v velocity
z propagation distance
λ wavelength

The invention claimed is:

1. A method of distinguishing whether a detected change in reflected power in an optical time domain reflectometer (OTDR) measurement carried out in a fiber optic transmission system using an OTDR is caused by an event causing actual attenuation or a change in a mode field diameter, comprising:
emitting a succession of first sampling light pulses of a first wavelength into the fiber optic transmission system while a pumping signal with a second wavelength is emitted into the fiber optic transmission system, and measuring a first OTDR trace resulting from the reflection of the first sampling light pulses in the fiber optic transmission system; such that the first sampling light pulses and their reflections interact with the pumping signal via stimulated Raman scattering; and
determining, based at least on information extracted from the first OTDR trace, whether the detected change is mainly due to the event causing actual attenuation or to the change in the mode field diameter in the fiber optic transmission system.

2. The method of claim 1, wherein the first wavelength is larger than the second wavelength, such that the first sampling light pulses and their reflections are Raman amplified by the pumping signal.

3. The method of claim 1, further comprising emitting a succession of second sampling light pulses of the second wavelength into the fiber optic transmission system and measuring a second OTDR trace resulting from the reflection of the second sampling light pulses in the fiber optic transmission system, wherein the determining whether the detected change is mainly due to the event causing actual attenuation or to the change in the mode field diameter in the fiber optic transmission system comprises determining, based on information extracted from both the first and second OTDR traces, whether the detected change is mainly due to the event causing actual attenuation or to the change in the mode field diameter in the fiber optic transmission system.

4. The method of claim 3, further comprising emitting a succession of third sampling light pulses of the first wavelength into the fiber optic transmission system and detecting a third OTDR trace resulting from the reflection of the third sampling light pulses in the fiber optic transmission system, wherein determining whether the detected change is mainly due to the event causing actual attenuation or to the change in the mode field diameter in the fiber optic transmission system is further based on information extracted from said third OTDR trace.

5. The method of claim 4, wherein the information extracted from the third OTDR trace comprises information about the change in reflected power for the first wavelength caused by the event causing actual attenuation or the change in the mode field diameter.

6. The method of claim 4, wherein the emitting a succession of second sampling light pulses and the emitting a succession of third sampling light pulses are carried out simultaneously.

7. The method of claim 1, wherein the determining whether the detected change is mainly due to the event causing actual attenuation or to the change in the mode field diameter of the fiber optic transmission system is carried out by machine learning.

8. The method of claim 1, wherein the determining whether the detected change is mainly due to the event causing actual attenuation or to the change in the mode field diameter is carried out by checking for consistency of information about the first, OTDR trace with empirical or calculated model data, wherein said model data comprises
first model data representing a first scenario in which the change in reflected power is due to an event causing actual attenuation only, and
second model data representing a second scenario in which the change in reflected power is due to a change in the mode field diameter of the fiber optic transmission system only.

9. The method of claim 8, wherein said first and second model data correspond to estimated or calculated predictions for the first OTDR trace under the corresponding scenario, and the step of checking for consistency comprises comparing the measured first OTDR trace with said estimated or calculated prediction for the first OTDR trace.

10. The method of claim 8, wherein the model data comprises or is calculated based on an estimate of the corresponding values of the Raman gain experienced by the first sampling light pulses under the first and second scenarios.

11. The method of claim 10, wherein said estimate of the Raman gain is obtained from a mathematical expression based on the assumption that the pumping signal is not depleted by the first sampling light pulses and thus the power of the pumping signal decays exponentially along the fiber optic transmission system.

12. The method of claim 11, wherein said estimate of the Raman gain $G_{probe}(z)$ experienced by the first sampling light pulses under the first and second scenarios is given as $$G(z) = \frac{P_{pump}^0 \cdot g_R^I}{A_{eff}^I} \cdot \frac{1}{\alpha_{pump}}[1 - \exp(-\alpha_{pump} z)] \cdot \gamma \cdot \exp(-\delta \cdot a_{pump})$$

where $P_{pump}^0$ denotes the pump power before an attenuation event or a change in the mode field diameter, $g_R^I$ is a Raman coefficient of the fiber optic transmission system before said attenuation event or change in the mode field diameter, $A_{eff}^I$ stands for the effective mode field area of the fiber optic transmission system before said attenuation event or change in the mode field diameter, $\alpha_{pump}$ is the change in absorption displayed for said attenuation event or change in the mode field diameter by the pump signal, $\alpha_{pump}$ is the attenuation coefficient of the pump signal in the fiber optic transmission system after said attenuation event or change in the mode field diameter, z is the position along the fiber optic transmission fiber after said attenuation event or change in the mode field diameter, and γ is the ratio of the Raman coefficients of the fiber optic transmission system before and after the attenuation event or change in the mode field diameter, $$\gamma = \frac{g_R^{II}}{g_R^I},$$

with $g_R^{II}$ being the Raman coefficient of the fiber optic transmission system after said attenuation event or change in the mode field diameter,
wherein the first scenario is characterised by a value of $\delta=1$, and wherein the second scenario is characterised by a value $\delta=2$.

13. The method claim 1, wherein wavelength difference between the first and the second wavelength is between 20 nm and 110 nm.

14. The method claim 1, wherein at least one of the first and the second wavelength has a value of between 1400 nm and 1510 nm.

15. The method claim 4, wherein at least one of the first, second, and third sampling light pulses are emitted at a power between 0.1 mW and 50 mW.

16. The method claim 1, wherein the pumping signal is emitted at a power between 100 mW and 3000 mW.

17. A method of determining a change in absorption in a fiber optic transmission system using an optical time domain reflectometer (OTDR), wherein the method comprises:
   detecting a change in reflected power in an optical time domain reflectometer (OTDR) measurement carried out in the fiber optic transmission system,
   determining whether the detected change is mainly due to an event causing actual attenuation or to a change in the mode field diameter in the fiber optic transmission system according to the method of claim 1, and
   determining the change in absorption based on the detected change in reflected power and on whether the detected change is mainly due to an event causing actual attenuation or to a change in the mode field diameter of the fiber optic transmission system.

18. An optical time domain reflectometer (OTDR) configured for determining a change in absorption in a fiber optic transmission system, said OTDR comprising:
   a light source configured for emitting a succession of sampling light pulses into the fiber optic transmission system;
   a light receiver configured for detecting reflected light pulses resulting from the reflection of the sampling light pulses in the fiber optic transmission system and for generating a corresponding OTDR trace from the reflected light pulses; and
   a processing unit operatively connected to the light receiver and the light source, wherein the processing unit is configured for:
   controlling the light source to emit a succession of first sampling light pulses of a first wavelength into the fiber optic transmission system and controlling the light source or a pumping arrangement to emit a pumping signal with a second wavelength into the fiber optic transmission system, and controlling the light receiver to measure a first OTDR trace resulting from the reflection of the first sampling light pulses in the fiber optic transmission system received by the light receiver; such that the first sampling light pulses and their reflections interact with the pumping signal via stimulated Raman scattering;
   detecting a change in reflected power in the first OTDR trace; and
   determining whether the detected change is mainly due to an event causing actual attenuation or to a change in the mode field diameter in the fiber optic transmission system, and/or
   determining the change in absorption based on the detected change in reflected power and on whether the detected change is mainly due to an event causing actual attenuation or to a change in the mode field diameter of the fiber optic transmission system.

19. The OTDR of claim 18, wherein the processing unit is further configured for:
   controlling the light source to emit a succession of second sampling light pulses of the first or second wavelength into the fiber optic transmission system and controlling the light receiver to measure a further OTDR trace resulting from the reflection of the second sampling light pulses; and
   detecting a change in reflected power in the first OTDR and the further OTDR trace.

20. The OTDR of claim 18 further comprising a second light receiver, wherein the light receiver and the second light receiver are configured for detecting reflected light pulses of different wavelengths.

21. The OTDR of claim 18, wherein the light source is configured for emitting the first and second sampling light pulses with a wavelength difference between the first and the second wavelength between 20 nm and 110 nm.

22. The OTDR of claim 18, wherein the light source is configured for emitting at least one of the first and second sampling light pulses at a wavelength of between 1400 nm and 1510 nm.

23. The OTDR of claim 18, wherein the light source is configured for emitting at least one of the first, and second sampling light pulses at a power between 0.1 mW and 50 mW.

24. The OTDR of claim 18, wherein the light source is configured for emitting the pumping signal at a power between 100 mW and 3000 mW.

* * * * *